US012656701B2

(12) United States Patent
Yoshida et al.

(10) Patent No.: US 12,656,701 B2
(45) Date of Patent: Jun. 16, 2026

(54) TONER AND METHOD OF PRODUCING TONER

(71) Applicant: CANON KABUSHIKI KAISHA, Tokyo (JP)

(72) Inventors: Nobuhiro Yoshida, Ibaraki (JP); Kohei Yoshiyama, Chiba (JP); Maki Imura, Kanagawa (JP); Kenta Mitsuiki, Ibaraki (JP); Kentaro Kamae, Kanagawa (JP); Yuu Nishimura, Chiba (JP); Kazunari Ooyama, Ibaraki (JP); Nobuyoshi Sugahara, Tokyo (JP); Hisasuke Kajihara, Ibaraki (JP); Yuya Chimoto, Chiba (JP); Takaho Shibata, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 546 days.

(21) Appl. No.: 18/181,105

(22) Filed: Mar. 9, 2023

(65) Prior Publication Data

US 2023/0305415 A1 Sep. 28, 2023

(30) Foreign Application Priority Data

Mar. 23, 2022 (JP) ................................ 2022-046564
Dec. 21, 2022 (JP) ................................ 2022-204135
Jan. 17, 2023 (JP) ................................ 2023-004802

(51) Int. Cl.
*G03G 9/087* (2006.01)
*G03G 9/08* (2006.01)

(52) U.S. Cl.
CPC ......... *G03G 9/08755* (2013.01); *G03G 9/081* (2013.01)

(58) Field of Classification Search
CPC .......................... G03G 9/08755; G03G 9/081
See application file for complete search history.

(56) References Cited

U.S. PATENT DOCUMENTS 7,022,449 B2 4/2006 Sugahara
7,138,213 B2 11/2006 Itakura
(Continued)

FOREIGN PATENT DOCUMENTS

EP 2 434 347 A1 3/2012
EP 3 106 922 A1 12/2016
(Continued)

OTHER PUBLICATIONS

Fedors, Robert F., A Method for Estimating Both the Solubility Parameters and Molar Volumes of Liquids, Polym. Eng. Sci., vol. 14, No. 2 (1974) 147-54.
(Continued)

*Primary Examiner* — Mark F. Huff
*Assistant Examiner* — Boone Alexander Evans
(74) *Attorney, Agent, or Firm* — VENABLE LLP

(57) ABSTRACT

A toner includes a toner particle containing a binder resin and a release agent. The binder resin contains an amorphous resin and a crystalline resin, and a content of the crystalline resin is 1.0 to 20.0% by mass based on a mass of the binder resin. In a cross-section of the toner particle observed by scanning transmission electron microscopy, (i) there exists a matrix A of the amorphous resin with domains A of the release agent dispersed therein, (ii) domains A each include a matrix B of the release agent having domains B of the crystalline resin dispersed therein, and (iii) domains A each being covered with the crystalline resin having an average coverage of the domains A by the crystalline resin of 70% or more.

10 Claims, 2 Drawing Sheets

(56) References Cited

U.S. PATENT DOCUMENTS

| | | | |
|---|---|---|---|
| 7,144,668 B2 | 12/2006 | Baba | |
| 7,147,980 B2 | 12/2006 | Itakura | |
| 7,279,262 B2 | 10/2007 | Fujikawa | |
| 7,300,733 B2 | 11/2007 | Sugahara | |
| 7,320,850 B2 | 1/2008 | Itakura | |
| 7,396,626 B2 | 7/2008 | Fujikawa | |
| 7,396,629 B2 | 7/2008 | Baba | |
| 7,442,478 B2 | 10/2008 | Itakura | |
| 7,833,687 B2 | 11/2010 | Kato | |
| 8,084,174 B2 | 12/2011 | Hasegawa | |
| 8,323,726 B2 | 12/2012 | Naka | |
| 8,697,327 B2 | 4/2014 | Shibata | |
| 8,921,023 B2 | 12/2014 | Baba | |
| 8,927,188 B2 | 1/2015 | Naka | |
| 8,974,994 B2 | 3/2015 | Kamae | |
| 8,986,914 B2 | 3/2015 | Fujikawa | |
| 9,057,970 B2 | 6/2015 | Ida | |
| 9,058,924 B2 | 6/2015 | Komatsu | |
| 9,063,443 B2 | 6/2015 | Ishigami | |
| 9,348,247 B2 | 5/2016 | Ida | |
| 9,500,975 B2 | 11/2016 | Sugahara | |
| 9,540,483 B2 | 1/2017 | Ida | |
| 9,599,920 B2 | 3/2017 | Sugahara | |
| 9,665,023 B2 | 5/2017 | Kamae | |
| 9,696,644 B2 | 7/2017 | Ida | |
| 9,778,598 B2 | 10/2017 | Onozaki | |
| 9,785,070 B2 | 10/2017 | Sugahara | |
| 9,897,934 B2 | 2/2018 | Tamura | |
| 9,915,885 B2 | 3/2018 | Katsumata | |
| 9,958,809 B2 | 5/2018 | Sugahara | |
| 9,969,834 B2 | 5/2018 | Ohtsu | |
| 10,007,206 B2 | 6/2018 | Sugahara | |
| 10,012,918 B2 | 7/2018 | Ishigami | |
| 10,012,920 B2 | 7/2018 | Shibata | |
| 10,012,921 B2 | 7/2018 | Kamae | |
| 10,078,281 B2 | 9/2018 | Ida | |
| 10,088,765 B2 | 10/2018 | Miyakai | |
| 10,133,201 B2 | 11/2018 | Kamae | |
| 10,203,619 B2 | 2/2019 | Yamashita | |
| 10,216,108 B2 | 2/2019 | Iwasaki | |
| 10,228,629 B2 | 3/2019 | Tamura | |
| 10,234,777 B2 | 3/2019 | Ohtsu | |
| 10,353,312 B2 | 7/2019 | Kamae | |
| 10,409,188 B2 | 9/2019 | Sugahara | |
| 10,423,090 B2 | 9/2019 | Ohtsu | |
| 10,451,990 B2 | 10/2019 | Kamae | |
| 10,514,624 B2 | 12/2019 | Tamura | |
| 10,642,178 B2 | 5/2020 | Yamashita | |
| 10,656,545 B2 | 5/2020 | Kamae | |
| 10,775,710 B1 | 9/2020 | Kamae | |
| 10,838,317 B2 | 11/2020 | Sugahara | |
| 10,859,931 B2 | 12/2020 | Hashimoto | |
| 10,859,936 B2 | 12/2020 | Sugahara | |
| 10,877,386 B2 | 12/2020 | Murayama | |
| 10,877,391 B2 | 12/2020 | Matsuo | |
| 10,969,705 B2 | 4/2021 | Shirayama | |
| 11,029,617 B2 | 6/2021 | Chimoto | |
| 11,112,711 B2 | 9/2021 | Ochi | |
| 11,131,938 B2 | 9/2021 | Murayama | |
| 11,385,558 B2 | 7/2022 | Chimoto | |
| 11,429,032 B2 | 8/2022 | Shibata | |
| 11,624,986 B2 | 4/2023 | Kanno | |
| 11,662,670 B2 | 5/2023 | Hama | |
| 11,675,283 B2 | 6/2023 | Kamae | |
| 2010/0151377 A1 | 6/2010 | Uchino | |
| 2014/0287353 A1 | 9/2014 | Sakamoto | |
| 2017/0160660 A1 | 6/2017 | Hasegawa | |
| 2017/0315463 A1 | 11/2017 | Onozaki | |
| 2017/0336726 A1* | 11/2017 | Hasegawa | G03G 9/0926 |
| 2017/0371256 A1 | 12/2017 | Shirai | |
| 2020/0183295 A1 | 6/2020 | Kanno | |
| 2020/0409285 A1 | 12/2020 | Tokunaga | |
| 2021/0055668 A1 | 2/2021 | Tamura | |
| 2021/0181647 A1 | 6/2021 | Hashimoto | |
| 2021/0181651 A1 | 6/2021 | Kanno | |
| 2021/0223710 A1 | 7/2021 | Takahashi | |
| 2021/0278774 A1 | 9/2021 | Hashimoto | |
| 2021/0278775 A1 | 9/2021 | Kamae | |
| 2021/0286282 A1 | 9/2021 | Kobori | |
| 2021/0302853 A1 | 9/2021 | Murata | |
| 2021/0302854 A1 | 9/2021 | Kitamura | |
| 2021/0397106 A1 | 12/2021 | Kobori | |
| 2022/0050398 A1 | 2/2022 | Ooyama | |
| 2022/0197163 A1 | 6/2022 | Kajihara | |
| 2022/0197166 A1 | 6/2022 | Chimoto | |
| 2022/0197174 A1 | 6/2022 | Kajihara | |
| 2022/0342335 A1 | 10/2022 | Ochi | |
| 2022/0373911 A1 | 11/2022 | Kamae | |
| 2022/0373919 A1 | 11/2022 | Imura | |

FOREIGN PATENT DOCUMENTS

| | | |
|---|---|---|
| JP | 2016-33648 A | 3/2016 |
| JP | 2017-191148 A | 10/2017 |
| JP | 2020-64140 A | 4/2020 |
| WO | 2013/115409 A1 | 8/2013 |

OTHER PUBLICATIONS

U.S. Appl. No. 18/180,430, Maki Imura, filed Mar. 8, 2023.
U.S. Appl. No. 18/182,548, Kenta Mitsuiki, filed Mar. 13, 2023.
U.S. Appl. No. 18/183,368, Hisasuke Kajihara, filed Mar. 14, 2023.
U.S. Appl. No. 18/185,422, Kentaro Kamae, filed Mar. 17, 2023.
U.S. Appl. No. 18/333,853, Maki Imura, filed Jun. 13, 2023.

* cited by examiner

TONER AND METHOD OF PRODUCING TONER

BACKGROUND OF THE INVENTION

Field of the Invention

The present invention relates to a toner used in an electrophotographic system, an electrostatic recording system, and an electrostatic printing system, and a method of producing the toner.

Description of the Related Art

In recent years, as electrophotographic full-color copiers have become more widely used, there has been a demand for not only higher speed and higher image quality, but also additional performance improvements, such as energy-saving performance and compatibility with a wide variety of media.

Specifically, as a toner for saving energy, there is a demand for a toner that can be fixed at lower temperatures and is excellent in low-temperature fixability in order to reduce power consumption in the fixing steps.

Japanese Patent Application Laid-Open No. 2020-064140 proposes, as a toner excellent in low-temperature fixability, a toner using a crystalline polyester as a binder resin for the toner. In addition, in order to improve the releasability from the fixing member during low-temperature fixing, it is common for the toner to contain a release agent.

Meanwhile, thick coated paper, which is one of a wide variety of media, contains a large quantity of inorganic fine particles such as calcium carbonate in order to increase the degree of whiteness, so that the coefficient of friction due to rubbing between paper sheets becomes large, and the toner can easily be released from the paper in the fixed image. Therefore, in order to suppress the release of the toner due to rubbing between paper sheets, there is a demand for a toner excellent in abrasion resistance.

SUMMARY OF THE INVENTION

The toner described in Japanese Patent Application Laid-Open No. 2020-064140 achieves a state in which the image surface is uniformly covered with a release agent by controlling the dispersion state of the crystalline resin and release agent in the toner particle to assist the effect of orienting the release agent to the image surface during fixing. From this, it is expected that the abrasion resistance of the image is improved compared with the conventional one. However, the release agent has a low affinity with the binder resin for the toner, and the release agent is gradually separated from the image surface by repeated abrasion, and finally the toner is released. This problem can be solved by supplying a sufficient amount of release agent to the image surface. It is known, however, that in the case of toner containing such a large amount of release agent, when the release agent is sandwiched between individual particles of the toner particle during fixing, the mechanical strength of the toner binder resin layer is lowered, lowering the scratch resistance against sharp needles and the like.

Further, as a means for reducing the coefficient of friction of the image surface, it is possible to use a means for distributing the crystalline resin on the image surface. In this case, it has been found that the crystalline resin has a high affinity with the binder resin for the toner, but when the amount of the crystalline resin material put is increased, there will be more charge leakages due to the crystal structure of the resin, such as a tendency of lowered charge amount of the toner in a high temperature and high humidity environment for instance, and the charge retention property may deteriorate.

In view of the above, there is an urgent need to develop a toner capable of forming an image layer exhibiting excellent abrasion resistance and scratch resistance in addition to exhibiting excellent charge retention properties and low-temperature fixability.

The present invention has been made in view of the above problems. The present invention provides a toner capable of forming an image layer exhibiting excellent abrasion resistance and scratch resistance in addition to exhibiting excellent charge retention properties and low-temperature fixability.

The present invention is directed to a toner including:

a toner particle containing a binder resin and a release agent, in which the binder resin contains an amorphous resin and a crystalline resin, and a content of the crystalline resin is 1.0% by mass or more and 20.0% by mass or less based on a mass of the binder resin, and in a cross-section of the toner particle observed by scanning transmission electron microscopy, (i) there exist a matrix A of the amorphous resin and domains A of the release agent dispersed in the matrix A, (ii) the domains A each include a matrix B of the release agent and domains B of the crystalline resin dispersed in the matrix B, and (iii) the domains A are each covered with the crystalline resin, and an average coverage of the domains A by the crystalline resin is 70% or more, and a melting point difference obtained by subtracting a melting point of the release agent from a melting point of the crystalline resin is 0° C. or more and 10° C. or less, and a visible light transmittance per 1 mm optical path length of a heat-melted crystalline resin composition obtained by separation operation of an N,N-dimethylformamide soluble fraction of the toner particle by a solvent gradient elution method is 90% or more.

In addition, the present invention is a method of producing a toner that produces a toner of the above configuration, the production method including: a kneading step of melt-kneading a material containing the amorphous resin and the crystalline resin as well as the release agent to obtain a melt-kneaded product; and a pulverization step of pulverizing the melt-kneaded product to obtain powder.

Further features of the present invention will become apparent from the following description of exemplary embodiments with reference to the attached drawings.

BRIEF DESCRIPTION OF THE DRAWINGS

FIG. 1B is an enlarged schematic cross-sectional diagram of domain A(3) in FIG. 1A.

DESCRIPTION OF THE EMBODIMENTS

In the present invention, the expressions of "xx or more and yy or less" and "xx to yy" representing numerical ranges mean numerical ranges including the endpoint lower and upper limits, unless otherwise specified.

Furthermore, a crystalline resin refers to a resin in which an endothermic peak is observed by differential scanning calorimetry (DSC).

Features of the Present Invention

A toner of the present invention includes a toner particle (a toner base particle) containing a binder resin and a release agent, wherein the binder resin contains an amorphous resin and a crystalline resin.

Figure 1A:
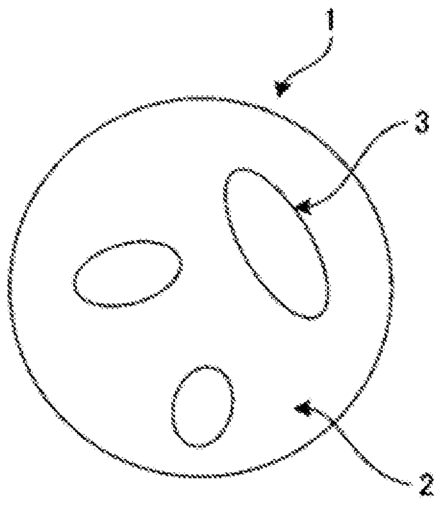
FIGS. 1A and 1B are each a schematic cross-sectional diagram of a toner particle constituting the toner defined in the present invention, where

The toner of the present invention exhibits a cross-sectional structure shown in FIG. 1A when observed under a scanning transmission electron microscope, and has domains A (3 in FIGS. 1A and 1B) derived from the release agent which are dispersed in a matrix A (2 in FIG. 1A) of the amorphous resin constituting the toner base particles (1 in the same figure). The release agent-derived domains A exhibit a cross-sectional structure shown in FIG. 1B, and each release agent-derived domain A (3 in FIG. 1B) includes crystalline resin-derived domains B (3*c* in the same figure) dispersed in a release agent matrix B (3*b* in the same figure). Furthermore, each of the release agent-derived domains A (matrix 3*b*) is covered with the crystalline resin (3*a* in FIG. 1B), and the average value of the coverage (Cc) of the domains A (matrix 3*b*) by the crystalline resin 3*a* measured by the method described later is 70% or more.

When the average value of the coverage Cc is within the above range, heat-fixing the toner onto the media allows the crystalline resin to be distributed near the interface between the release agent distributed on the image surface and the amorphous resin distributed on the media side. When the average value of the coverage Cc is 75% or more, this effect is further improved, which is preferable.

As to the crystalline resin and release agent in the present invention, the melting point difference (Mpc−Mpw) obtained by subtracting the melting point Mpw of the release agent from the melting point Mpc of the crystalline resin is 0° C. or more and 10° C. or less.

Here, suppose that in differential scanning calorimetry (DSC), the crystalline resin and the release agent undergo (i) a first process of raising the temperature from 20° C. to 180° C. at a rate of temperature rise of 10° C./min, (ii) following the first process, a second process of lowering the temperature from 180° C. to 20° C. at a rate of temperature fall of 10° C./min, and (iii) following the second process, a third process of raising the temperature from 20° C. to 180° C. at a rate of temperature rise of 10° C./min.

If the second DSC temperature rise curve obtained in the third process has an endothermic peak having a peak top temperature in the range of 70° C. or higher and 120° C. or lower, this peak top temperature is taken as the melting point. Details of the measurement method will be described later.

Although it is not exactly clear why the crystalline resin and the release agent having a melting point difference within the range described above can be suitably used, it is presumed as follows.

It is considered that when the melting points of the crystalline resin and the release agent satisfy the above relationship, the crystalline resin (Cin) included in the release agent domains A and the crystalline resin (Cout) covering the release agent domains A melted in the toner with a time lag, so that at the time of fixing, Cout melts prior to Cin and the release agent. After that, the release agent is melted, and then distributed on the image surface together with Cin, and Cin is finally melted and coalesced with Cout distributed at the interface between the release agent and the amorphous resin as described above. It is considered that during this coalescence process, the crystalline resin is caused to have a complicated concentration gradient in the release agent layer. It is considered that this effect improves the adhesion between the amorphous resin layer and the release agent layer on the image surface.

The visible light transmittance (Tc) per 1 mm optical path length of a heat-melted crystalline resin composition separated by separation operation of an N,N-dimethylformamide soluble fraction of the toner particle of the present invention by the solvent gradient elution method, measured according to the method described below, is 90% or more. Note that the crystalline resin composition separated here is a composition containing both Cin and Cout.

It is considered that when Tc is within the above range, the crystalline resin component in the toner is a single or miscible component, and Cin and Cout can be coalesced during fixing.

The content (Wc) of the crystalline resin in the toner particle based on the mass of the binder resin is 1.0% by mass or more and 20.0% by mass or less.

Figure 1B:
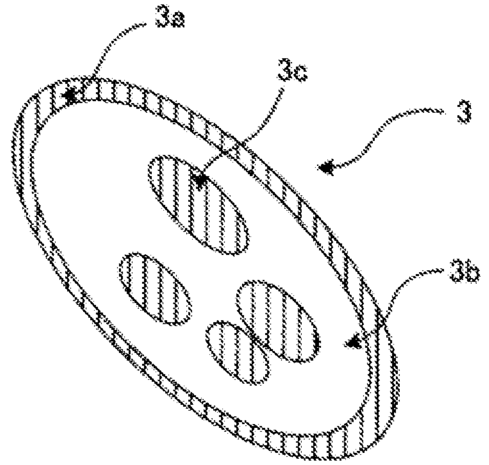

When Wc is within the above range, there is sufficient crystalline resin to plasticize the amorphous resin, so that excellent low-temperature fixability is obtained, and release agent-derived domains 3 having a structure as shown in FIG. 1B are formed, and therefore the adhesion between the amorphous resin layer and the release agent layer on the image surface is improved, making it possible to obtain excellent abrasion resistance.

When Wc is less than 1.0% by mass, the amount of the crystalline resin that plasticizes the amorphous resin is small, making it difficult to obtain excellent low-temperature fixability. Meanwhile, when Wc exceeds 20.0% by mass, it becomes difficult to obtain release agent-derived domains 3 having the structure shown in FIG. 1B. The content of the crystalline resin in the binder resin can be controlled by the amount of crystalline resin added.

Wc is preferably 5.0% by mass or more and 15.0% by mass or less, more preferably 5.0% by mass or more and 12.0% by mass or less.

Let tw1 be the half width [° C.] of the endothermic peak derived from the crystalline resin in the first temperature rise process, and let tw2 be the half width [° C.] of the endothermic peak derived from the crystalline resin in the second temperature rise process, measured in the DSC measurement according to the method described later. In the toner of the present invention, tw1 and tw2 preferably satisfy the following formula:

$$tw2>tw1.$$

It is considered that tw1 expresses a change in crystalline state of the crystalline resin in individual particles of the toner, and tw2 expresses a change in crystalline state of the crystalline resin in the toner after the fixing step. A toner in which tw1 and tw2 have the above relationship is preferable because it can be judged that the crystalline resin in the release agent layer has the property of easily causing a complicated concentration gradient mentioned in the above, making it likely to improve the image abrasion resistance. Furthermore, tw1 and tw2 more preferably satisfy the following formula:

$$tw2/tw1\geq 1.20$$

because it is considered that the above effects are expressed more strongly.

In order to achieve a toner in which tw1 and tw2 have a suitable relationship, the melting point difference (Mpc−Mpw) obtained by subtracting the melting point Mpw of the release agent from the melting point Mpc of the crystalline resin is more preferably 0° C. or higher and 7° C. or lower, further preferably 0° C. or higher and 4° C. or lower. In addition, let SPc be the SP value $[(J/cm^3)^{0.5}]$ of the crystalline resin, and let SPa be the SP value $[(J/cm^3)^{0.5}]$ of the amorphous resin, calculated by the method described later. SPc and SPa desirably satisfy the following formula:

$$SPa-SPc\leq 2.95.$$

Further, let SPw be the SP value $[(J/cm^3)^{0.5}]$ of the release agent, calculated by the method described later. SPc and SPw preferably satisfy the following formula:

$$SPc-SPw\leq 5.11.$$

SPc and SPw preferably have the above relationship because the crystalline resin is highly likely to form domains in the vicinity of the release agent rather than forming domains by itself, achieving a structure capable of exhibiting the above effects. The value of SPc−SPw is more preferably 4.50 or less, most preferably 3.89 or less.

The ratio (average area ratio of the crystalline resin Cin in domain A of the release agent: Ca) of the cross-sectional area of the crystalline resin Cin (3*c* in FIG. 1B) included in the release agent domain A to the cross-sectional area of the release agent domain A (3 in FIGS. 1A and 1B) is preferably 10% or more and 50% or less. Ca is preferably 10% or more because Cin and Cout are easily coalesced during fixing. Ca is preferably 50% or less because it is considered that the distribution of Cin on the image surface in the fixing step is likely to proceed favorably. Ca is more preferably 20% or more and 45% or less, further preferably 30% or more and 45% or less.

The toner in the present invention contains three kinds of amorphous resins. Let SP1, SP2 and SP3 be their SP values $[(J/cm^3)^{0.5}]$. SP1, SP2, SP3, and SPc preferably satisfy the following relational formulas:

$$2.05\leq SP1-SPc\leq 2.86$$

$$0.20\leq SP2-SP1\leq 0.61$$

$$0.20\leq SP3-SP2\leq 0.61.$$

Although the principle of this is not clear, it is presumed as follows.

It is considered that if there are three types of amorphous resins, one of them exists as a matrix while the other two components form fine domains. Here, when the SP value of each component satisfies the above relational formulas, it is presumed that the components are incompatible with each other, which is likely to result in a state in which the domain size is sufficiently smaller than the cross-sectional diameter of the toner. It is considered that in such a state, when SPc satisfies the above relational formulas, the space for crystal growth is limited when the release agent or the crystalline resin is to grow as crystals, which inhibits the crystalline resin and release agent from forming domains by themselves, allows the crystalline resin to be present as domains 3*c* of the crystalline resin Cin dispersed within the matrix 3*b* of the release agent, and makes it likely for the domain 3 (matrix 3*b*) of the release agent to be covered with the coating layer 3*a* of the crystalline resin Cout.

Both the crystalline resin and the amorphous resin contained in the toner of the present invention are preferably polyester resins.

By using a polyester resin, it becomes easy to obtain a configuration that can sufficiently charge the toner even in a configuration that can ensure low-temperature fixability.

The toner of the present invention is preferably produced by a method (kneading pulverization method) including a kneading step of melt-kneading a material containing an amorphous resin and a crystalline resin as well as a release agent to obtain a melt-kneaded product and a pulverization step of pulverizing the melt-kneaded product to obtain powder.

In forming a toner capable of exhibiting the above properties, the melt-kneading method is suitable as a method of producing the toner of the present invention because it makes it possible to control the mixed state of resins not only by the relationship between the SP values but also by the relationship between the melting points, which facilitates achieving the toner. Details of the production method will be described later.

[Each Toner Configuration]

In the present invention, preferred toner configurations will be described in detail below.

<Binder Resin>

The toner particle of the toner of the present invention contains a binder resin. The binder resin includes crystalline resins and amorphous resins, and various resin compounds known as binder resins can be used in combination as long as the above effects are not impaired. Examples of such resin compounds include phenol resins, natural resin-modified phenol resins, natural resin-modified maleic resins, acrylic resins, methacrylic resins, polyvinyl acetate resins, silicone resins, polyester resins, polyurethanes, polyamide resins, furan resins, epoxy resins, xylene resins, polyvinyl butyral resins, terpene resins, coumarone-indene resins, and petroleum-based resins.

Among these, polyester resins are particularly suitable for use because they make it easy to achieve a design satisfying both fixability and chargeability.

<Amorphous Resin>

The amorphous resin is preferably an amorphous polyester which is a condensation polymer of polyhydric alcohols (dihydric or trihydric or higher alcohols), polyhydric carboxylic acids (dihydric or trihydric or higher carboxylic acids), and acid anhydrides thereof or lower alkyl esters thereof.

As the polyhydric alcohol monomer for the amorphous polyester, the following polyhydric alcohol monomers can be used. Examples of dihydric alcohol components include ethylene glycol, propylene glycol, 1,3-butanediol, 1,4-butanediol, 2,3-butanediol, diethylene glycol, triethylene glycol, 1,5-pentanediol, 1,6-hexanediol, neopentyl glycol, 2-ethyl-1,3-hexanediol, and hydrogenated bisphenol A, as well as a bisphenol represented by formula (A) and derivatives thereof:

(A)

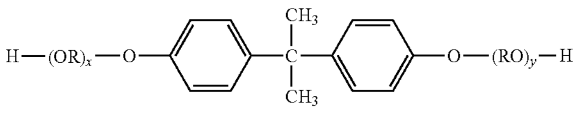

where R is an ethylene or propylene group, x and y are each an integer of 0 or more, and the average value of x+y is 0 or more and 10 or less, and a diol represented by formula (B).

(B)

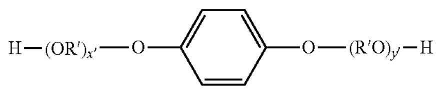

where R' is $-CH_2-CH_2-$, $-CH_2-CH(CH_3)-$ or $-CH_2-C(CH_3)_2-$, and x' and y' are each an integer of 0 or more, and the average value of x'+y' is 0 or more and 10 or less.

Examples of trihydric or higher alcohol components include sorbitol, 1,2,3,6-hexanetetrol, 1,4-sorbitan, pentaerythritol, dipentaerythritol, tripentaerythritol, and 1,2,4-butanetriol, 1,2,5-pentanetriol, glycerol, 2-methylpropanetriol, 2-methyl-1,2,4-butanetriol, trimethylolethane, trimethylolpropane, and 1,3,5-trihydroxymethylbenzene. Among these, glycerol, trimethylolpropane, and pentaerythritol are preferably used. These dihydric alcohols and trihydric or higher alcohols can be used alone or in combination.

As the polyhydric carboxylic acid monomer for the polyester resin, the following polyhydric carboxylic acid monomers can be used.

Examples of dihydric carboxylic acid components include maleic acid, fumaric acid, citraconic acid, itaconic acid, glutaconic acid, phthalic acid, isophthalic acid, terephthalic acid, succinic acid, adipic acid, sebacic acid, muconic acid, dihydromuconic acid, azelaic acid, malonic acid, n-dodecenylsuccinic acid, iso-dodecenylsuccinic acid, n-dodecyl succinic acid, iso-dodecylsuccinic acid, n-octenylsuccinic acid, n-octylsuccinic acid, iso-octenylsuccinic acid, iso-octylsuccinic acid, and anhydrides of these acids and lower alkyl esters thereof. Among these, maleic acid, fumaric acid, terephthalic acid, and n-dodecenylsuccinic acid are preferably used.

Examples of trihydric or higher carboxylic acids, acid anhydrides thereof, and lower alkyl esters thereof include 1,2,4-benzenetricarboxylic acid, 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxyl-2-methyl-2-methylenecarboxypropane, 1,2,4-cyclohexanetricarboxylic acid, tetra(methylene carboxyl) methane, 1,2,7,8-octanetetracarboxylic acid, pyromellitic acid, Empol trimer acid, and acid anhydrides thereof or lower alkyl esters thereof.

Among these, 1,2,4-benzenetricarboxylic acid, that is, trimellitic acid or a derivative thereof, is particularly preferably used because it is inexpensive and reaction control is easy. These dihydric carboxylic acids and trihydric or higher carboxylic acids can be used alone or in combination.

Among them, as shown above, the alcohol component preferably has a linear aliphatic polyhydric alcohol al having 2 to 10 carbon atoms, and more preferably contains ethylene glycol from the viewpoint of the functionality and affinity of the linear aliphatic polyhydric alcohol al. Also, the alcohol component preferably contains a bisphenol represented by the formula (A). Meanwhile, the carboxylic acid component preferably contains terephthalic acid.

The amorphous polyester preferably contains 10% by mass or more and 35% by mass or less, more preferably 5% by mass or more and 25% by mass or less, of monomer units of linear aliphatic polyhydric alcohol al having 2 to 10 carbon atoms. The amorphous polyester preferably contains 25% by mass or more and 50% by mass or less, more preferably 35% by mass or more and 45% by mass or less, of monomer units of the bisphenol represented by the above formula (A). In addition, the amorphous polyester preferably contains 25% by mass or more and 50% by mass or less, more preferably 35% by mass or more and 45% by mass or less, of monomer units of terephthalic acid.

The method for producing the polyester is not particularly limited, and known methods can be used. For example, the aforementioned alcohol monomer and carboxylic acid monomer are charged at the same time, subjected to an esterification reaction or a transesterification reaction and a condensation reaction followed by polymerization to produce a polyester resin. Further, the polymerization temperature is not particularly limited, but is preferably in the range of 180° C. or higher and 290° C. or lower. Polymerization catalysts such as titanium-based catalysts, tin-based catalysts, zinc acetate, antimony trioxide, and germanium dioxide can be used in the polymerization of polyester. In particular, the amorphous polyester is more preferably a polyester resin polymerized using a tin-based catalyst.

The amorphous polyester may be a hybrid resin containing additional resin components as long as the amorphous polyester is the main component. The main component means that the content is 50% by mass or more and 100% by mass or less, preferably 80% by mass or more and 100% by mass or less, and more preferably 90% by mass or more and 100% by mass or less. For example, a hybrid resin of a polyester resin and a vinyl resin can be used. Methods of obtaining a reaction product of a vinyl-based resin and a polyester resin, such as a hybrid resin, include the following methods.

In the presence of monomer components capable of reacting with each of the vinyl resin and the polyester resin, a method of polymerizing either or both of the resins is preferable. For example, among monomers constituting polyester resin components, examples of ones that can react with vinyl copolymers include unsaturated dicarboxylic acids such as phthalic acid, maleic acid, citraconic acid, itaconic acid, glutaconic acid, muconic acid, and dihydromuconic acid, and anhydrides thereof. Among monomers constituting vinyl-based copolymer components, examples of ones that can react with polyester resin components include those having a carboxyl group or hydroxy group, and acrylic acid or methacrylic acid esters.

The content of the amorphous polyester in the binder resin is preferably 80.0% by mass or more and 97.0% by mass or less, more preferably 85.0% by mass or more and 95.0% by mass or less, and further preferably 86.0% by mass or more and 92.0% by mass or less.

In addition, the peak molecular weight of the amorphous polyester is preferably 3500 or more and 20000 or less from the viewpoint of low-temperature fixability and abrasion resistance. Further, the acid value of the amorphous polyester is preferably 5 mg KOH/g or more and 30 mg KOH/g or less from the viewpoint of charge retention property in a high-temperature and high-humidity environment. Moreover, the hydroxyl value of the amorphous polyester is preferably 20 mg KOH/g or more and 70 mg KOH/g or less from the viewpoint of low-temperature fixability and charge retention property.

<Crystalline Resin>

The crystalline resin is preferably a crystalline polyester which is a polymer of polyhydric alcohols (dihydric or trihydric or higher alcohols), polyhydric carboxylic acids (dihydric or trihydric or higher carboxylic acids), and acid anhydrides thereof or lower alkyl esters thereof. The crystalline polyester is preferably a condensation polymer of aliphatic dicarboxylic acids and aliphatic diols.

As the polyhydric alcohol monomer used for the crystalline polyester, the following polyhydric alcohol monomers can be used. The polyhydric alcohol monomer is not particularly limited, but is preferably a chain (more preferably linear) aliphatic diol, and examples thereof include ethylene glycol, diethylene glycol, triethylene glycol, 1,2-propylene glycol, 1,3-propylene glycol, dipropylene glycol, 1,4-butanediol, 1,4-butadiene glycol, trimethylene glycol, tetramethylene glycol, pentamethylene glycol, hexamethylene glycol, octamethylene glycol, nonamethylene glycol, decamethylene glycol, and neopentyl glycol. Among these, linear aliphatics and α,ω-diols such as ethylene glycol, diethylene glycol, 1,4-butanediol, and 1,6-hexanediol are particularly preferable.

Polyhydric alcohol monomers other than the above polyhydric alcohols can also be used. Among these polyhydric alcohol monomers, examples of dihydric alcohol monomers include aromatic alcohols such as polyoxyethylenated bisphenol A and polyoxypropylene bisphenol A; and 1,4-cyclohexanedimethanol. Further, among these polyhydric alcohol monomers, examples of trihydric or higher polyhydric alcohol monomers include aromatic alcohols such as 1,3,5-trihydroxymethylbenzene; and aliphatic alcohols such as pentaerythritol, dipentaerythritol, tripentaerythritol, 1,2,4-butanetriol, 1,2,5-pentanetriol, glycerin, 2-methylpropanetriol, 2-methyl-1,2,4-butanetriol, trimethylolethane, and trimethylolpropane.

As the polyhydric carboxylic acid monomer used for the crystalline polyester, the following polyhydric carboxylic acid monomers can be used. The polyhydric carboxylic acid monomer is not particularly limited, but is preferably a chain (more preferably linear) aliphatic dicarboxylic acid. Specific examples thereof include oxalic acid, malonic acid, succinic acid, glutaric acid, adipic acid, pimelic acid, suberic acid, glutaconic acid, azelaic acid, sebacic acid, muconic acid, dihydromuconic acid, nonane dicarboxylic acid, decane dicarboxylic acid, undecane dicarboxylic acid, dodecane dicarboxylic acid, maleic acid, fumaric acid, mesaconic acid, citraconic acid, and itaconic acid. Hydrolyzed acid anhydrides or lower alkyl esters thereof are also included.

Polyhydric carboxylic acids other than the above polyhydric carboxylic acid monomers can also be used. Among additional polyhydric carboxylic acid monomers, examples of dihydric carboxylic acids include aromatic carboxylic acids such as isophthalic acid and terephthalic acid; aliphatic carboxylic acids such as n-dodecylsuccinic acid and n-dodecenylsuccinic acid; and alicyclic carboxylic acids such as cyclohexanedicarboxylic acid. Acid anhydrides or lower alkyl esters thereof are also included.

Further, among additional carboxylic acid monomers, examples of trihydric or higher carboxylic acids include aromatic carboxylic acids such as 1,2,4-benzenetricarboxylic acid (trimellitic acid), 2,5,7-naphthalenetricarboxylic acid, 1,2,4-naphthalenetricarboxylic acid, and pyromellitic acid, and aliphatic carboxylic acids such as 1,2,4-butanetricarboxylic acid, 1,2,5-hexanetricarboxylic acid, and 1,3-dicarboxyl-2-methyl-2-methylenecarboxypropane. Derivatives such as acid anhydrides or lower alkyl esters thereof are also included.

Among them, as shown above, it is preferable to use linear aliphatic polyhydric alcohols having 2 to 6 carbon atoms. The linear aliphatic polyhydric alcohol is more preferably ethylene glycol because of increased melting point, increased intermolecular force, and promoted folding starting there.

In addition, the linear aliphatic polyhydric carboxylic acid preferably has 8 to 18 carbon atoms, more preferably 9 to 16 carbon atoms, and further preferably 10 to 14 carbon atoms. The linear aliphatic polyhydric carboxylic acid is more preferably tetradecanedicarboxylic acid because of increased density of ester bond moieties in the polymer, increased intermolecular force, and promoted folding starting there.

From the viewpoint of suppressing blooming, the weight average molecular weight of the crystalline polyester is preferably 15000 or more and 300000 or less, more preferably 15000 or more and 50000 or less.

From the viewpoint of making the difference in melting point from the release agent described later within a range where the form of the present invention can be easily exhibited, the melting point of the crystalline resin is preferably 70° C. or higher and 115° C. or lower, more preferably 80° C. or higher and 105° C. or lower.

From the viewpoint of crystallization, the total of the acid value and hydroxyl value of the crystalline polyester is preferably 0.1 mg KOH/g or more and 5.0 mg KOH/g or less.

The crystalline polyester can be produced according to usual polyester synthesis methods. For example, a crystalline polyester can be obtained by subjecting the aforementioned carboxylic acid monomer and alcohol monomer to an esterification reaction or a transesterification reaction, followed by a polycondensation reaction under reduced pressure or by introducing nitrogen gas in accordance with a conventional method. After that, the desired crystalline polyester can be obtained by further adding the above-described aliphatic compounds and carrying out an esterification reaction.

The above esterification or transesterification reaction can be carried out using a usual esterification or transesterification catalyst such as sulfuric acid, titanium butoxide, dibutyltin oxide, manganese acetate, and magnesium acetate, if necessary.

In addition, the above polycondensation reaction can be carried out using a usual polymerization catalyst such as titanium butoxide, dibutyltin oxide, tin acetate, zinc acetate, tin disulfide, antimony trioxide, germanium dioxide, and other known catalysts. The polymerization temperature and catalyst amount are not particularly limited, and may be determined as appropriate.

In the esterification or transesterification reaction or polycondensation reaction, one may employ a method including charging all the monomers at once in order to increase the strength of the resulting crystalline polyester, or a method including first reacting a dihydric monomer and then adding and reacting a trihydric or higher monomer in order to reduce the quantity of low-molecular-weight components.

<Release Agent>

The toner particle of the toner of the present invention contains a release agent. Examples of release agents include the following.

Hydrocarbon-based waxes such as low-molecular-weight polyethylene, low-molecular-weight polypropylene, alkylene copolymers, microcrystalline wax, paraffin wax, and Fischer-Tropsch wax; hydrocarbon-based wax oxides such as oxidized polyethylene wax or block copolymers thereof; waxes containing fatty acid esters as a main component such as carnauba wax; and partially or wholly deoxidized fatty acid esters such as deoxidized carnauba wax. Saturated linear fatty acids such as palmitic acid, stearic acid, and montanic acid; unsaturated fatty acids such as brassidic acid, eleostearic acid, and parinaric acid; saturated alcohols such as stearyl alcohol, aralkyl alcohol, behenyl alcohol, carnauvyl alcohol, ceryl alcohol, and myricyl alcohol; polyhydric alcohols such as sorbitol; esters of fatty acids such as palmitic acid, stearic acid, behenic acid, and montanic acid with alcohols such as stearyl alcohol, aralkyl alcohol, behenyl alcohol, carnauvyl alcohol, ceryl alcohol, and myricyl alcohol; fatty acid amides such as linoleic acid amide, oleic acid amide, and lauric acid amide; saturated fatty acid bisamides such as methylenebis-stearic acid amide, ethylenebis-capric acid amide, ethylenebis-lauric acid amide, and hexamethylenebis-stearic acid amide; unsaturated fatty acid amides such as ethylenebis-oleic acid amide, hexamethylenebis-oleic acid amide, N,N'-dioleyl adipic acid amide, and N,N'-dioleyl sebacic acid amide; aromatic bisamides such as m-xylene bisstearic acid amide and N,N'-distearyl isophthalic acid amide; fatty acid metal salts such as calcium stearate, calcium laurate, zinc stearate, and magnesium stearate (generally referred to as metal soaps); waxes obtained by grafting a vinyl-based monomer such as styrene or acrylic acid to an aliphatic hydrocarbon-based wax; partial esters of fatty acids and polyhydric alcohols such as behenic acid monoglyceride; and methyl ester compounds having a hydroxyl group obtained by hydrogenation of vegetable oil.

Among these release agents, hydrocarbon waxes such as paraffin wax and Fischer-Tropsch wax are preferable from the viewpoint of suppressing blooming. That is, the wax preferably contains a hydrocarbon wax. More preferably, the wax is a Fischer-Tropsch wax.

From the viewpoint of suppressing blooming and ideally enclosing and coating in the crystalline resin domains, the content of the release agent is preferably 30 parts by mass or more and 200 parts by mass or less, more preferably 40 parts by mass or more and 130 parts by mass or less, and further preferably 50 parts by mass or more and 80 parts by mass or less, based on 100 parts by mass of the crystalline resin.

The melting point of the release agent is preferably 70° C. or higher and 105° C. or lower, more preferably 80° C. or higher and 95° C. or lower.

<Dispersant>

The toner particle preferably contains a dispersant in order to disperse the release agent in the resin. The dispersant used may be a known one, and when a hydrocarbon wax is contained as a release agent, it is preferable to contain a polymer having a structure in which a vinyl-based resin component and a hydrocarbon compound have reacted with each other, in order to disperse the wax in the resin. Among these, it is preferable to contain a graft polymer obtained by graft polymerization of a vinyl-based monomer to a polyolefin.

When the polymer is contained, the compatibility between the wax and the resin is promoted, and adverse effects such as poor charging due to poor dispersion of the wax and contamination of members are less likely to occur. In addition, the content of the dispersant is preferably 1.0 parts by mass or more and 15 parts by mass or less, based on 100 parts by mass of the binder resin. When the content is within this range, the wax tends to be uniformly dispersed in the amorphous resin.

The polyolefin is not particularly limited as long as it is a polymer or copolymer of unsaturated hydrocarbons, and various polyolefins can be used. In particular, polyethylene-based and polypropylene-based materials are preferably used. Two or more of these may be used.

Examples of monomers having vinyl-based groups include the following.

Styrenes such as styrene, o-methylstyrene, m-methylstyrene, p-methylstyrene, p-methoxystyrene, p-phenyl styrene, p-chlorostyrene, 3,4-dichlorostyrene, p-ethyl styrene, 2,4-dim ethyl styrene, p-n-butyl styrene, p-tert-butyl styrene, p-n-hexylstyrene, p-n-octylstyrene, p-n-nonylstyrene, p-n-decylstyrene, and p-n-dodecylstyrene, and styrenic units such as derivatives thereof.

Vinyl-based units containing N atoms, such as amino group-containing α-methylene aliphatic monocarboxylic acid esters such as dimethylaminoethyl methacrylate and diethylaminoethyl methacrylate; and acrylic acid and methacrylic acid derivatives such as acrylonitrile, methacrylonitrile, and acrylamide.

Vinyl-based units containing carboxy groups, such as unsaturated dibasic acids such as maleic acid, citraconic acid, itaconic acid, alkenyl succinic acid, fumaric acid, and mesaconic acid; unsaturated diacid anhydrides such as maleic anhydride, citraconic anhydride, itaconic anhydride, and alkenyl succinic anhydride; half esters of unsaturated dibasic acids such as maleic acid methyl half ester, maleic acid ethyl half ester, maleic acid butyl half ester, citraconic acid methyl half ester, citraconic acid ethyl half ester, citraconic acid butyl half ester, itaconic acid methyl half ester, alkenyl succinic acid methyl half ester, fumaric acid methyl half ester, and mesaconic acid methyl half ester; unsaturated dibasic acid esters such as dimethyl maleic acid and dimethyl fumaric acid; α,β-unsaturated acids such as acrylic acid, methacrylic acid, crotonic acid, and cinnamic acid; α,β-unsaturated acid anhydrides such as crotonic anhydride and cinnamic anhydride, and anhydrides of the above α,β-unsaturated acids and lower fatty acids; and alkenyl malonic acids, alkenyl glutaric acids, alkenyl adipic acids, anhydrides thereof, and monoesters thereof.

Vinyl-based units containing hydroxy groups, such as acrylic acid and methacrylic acid esters such as 2-hydroxyethyl acrylate, 2-hydroxyethyl methacrylate, and 2-hydroxypropyl methacrylate; and 4-(1-hydroxy-1-methylbutyl)styrene and 4-(1-hydroxy-1-methylhexyl)styrene.

Ester units composed of acrylic acid esters, such as acrylic acid esters such as methyl acrylate, ethyl acrylate, n-butyl acrylate, isobutyl acrylate, propyl acrylate, n-octyl acrylate, dodecyl acrylate, 2-ethylhexyl acrylate, stearyl acrylate, 2-chloroethyl acrylate, and phenyl acrylate.

Ester units composed of methacrylic acid esters, such as α-methylene aliphatic monocarboxylic acid esters such as cyclohexyl methacrylate, methyl methacrylate, ethyl methacrylate, propyl methacrylate, n-butyl methacrylate, isobutyl methacrylate, n-octyl methacrylate, dodecyl methacrylate, 2-ethylhexyl methacrylate, stearyl methacrylate, phenyl methacrylate, dimethylaminoethyl methacrylate, and diethylaminoethyl methacrylate. Two or more of these may be used.

The dispersant used in the present invention can be obtained by a known method such as the reaction between these polymers described above, or the reaction between the monomer of one polymer and the other polymer.

<Colorant>

The toner particle of the toner of the present invention may optionally contain a colorant. Examples of the colorant include the following.

Black colorants include those toned black using carbon black, yellow colorants, magenta colorants, and cyan colorants. As the colorant, a pigment may be used alone, or a dye and a pigment may be used in combination. From the viewpoint of full-color image quality, it is preferable to use a dye and a pigment in combination.

Examples of magenta toner pigments include the following. C.I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48:2, 48:3, 48:4, 49, 50, 51, 52, 53, 54, 55, 57:1, 58, 60, 63, 64, 68, 81:1, 83, 87, 88, 89, 90, 112, 114, 122, 123, 146, 147, 150, 163, 184, 202, 206, 207, 209, 238, 269, and 282; C.I. Pigment Violet 19; and C.I. Vat Red 1, 2, 10, 13, 15, 23, 29, 35.

Examples of magenta toner dyes include the following. Oil-soluble dyes such as C.I. Solvent Red 1, 3, 8, 23, 24, 25, 27, 30, 49, 81, 82, 83, 84, 100, 109, and 121; C.I. Disperse Red 9; C.I. Solvent Violet 8, 13, 14, 21, and 27; and C.I. Disperse Violet 1, and basic dyes such as C.I. Basic Red 1, 2, 9, 12, 13, 14, 15, 17, 18, 22, 23, 24, 27, 29, 32, 34, 35, 36, 37, 38, 39, and 40; and C.I. Basic Violet 1, 3, 7, 10, 14, 15, 21, 25, 26, 27, and 28.

Examples of cyan toner pigments include the following. C.I. Pigment Blue 2, 3, 15:2, 15:3, 15:4, 16, 17; C.I. Vat Blue 6; C.I. Acid Blue 45, and a copper phthalocyanine pigment having a phthalocyanine skeleton substituted with 1 to 5 phthalimidomethyl groups. Examples of cyan toner dyes include C.I. Solvent Blue 70.

Examples of yellow toner pigments include the following. C.I. Pigment Yellow 1, 2, 3, 4, 5, 6, 7, 10, 11, 12, 13, 14, 15, 16, 17, 23, 62, 65, 73, 74, 83, 93, 94, 95, 97, 109, 110, 111, 120, 127, 128, 129, 147, 151, 154, 155, 168, 174, 175, 176, 180, 181, and 185; and C.I. Vat Yellow 1, 3, and 20. Examples of yellow toner dyes include C.I. Solvent Yellow 162.

These colorants can be used singly or in combination, or in the form of a solid solution.

Colorants are selected in terms of hue angle, chroma, brightness, lightfastness, OHP transparency, and dispersibility in the toner particle.

The content of the colorant is preferably 0.1 parts by mass or more and 30.0 parts by mass or less, based on 100 parts by mass of the binder resin.

<Charge Control Agent>

The toner particle of the toner of the present invention may optionally contain a charge control agent. By blending a charge control agent, it becomes possible to stabilize the charge characteristics and control the optimum amount of triboelectrification according to the development system. As the charge control agent, known ones can be used, and a metal compound of an aromatic carboxylic acid is particularly preferable because it is colorless, has a high charging speed of the toner, and can stably maintain a constant charge amount.

Examples of negative charge control agents include metal salicylate compounds, metal naphthoate compounds, metal dicarboxylic acid compounds, and polymeric compounds having sulfonic acid or carboxylic acid as side chains, high-molecular-weight compounds having sulfonates or sulfonate esters as side chains, polymeric compounds having carboxylates or carboxylic acid esters as side chains, and boron compounds, urea compounds, silicon compounds, and calixarene.

The charge control agent may be added internally or externally to the toner particle. The content of the charge control agent is preferably 0.2 parts by mass or more and 10.0 parts by mass or less, more preferably 0.5 parts by mass or more and 10.0 parts by mass or less, based on 100 parts by mass of the binder resin.

<Inorganic Fine Particles>

The toner particle of the toner of the present invention may optionally contain inorganic fine particles. The inorganic fine particles may be added internally to the toner particle, or may be mixed with the toner as an external additive.

Examples of inorganic fine particles include fine particles such as silica fine particles, titanium oxide fine particles, alumina fine particles, and composite oxide fine particles thereof. Among inorganic fine particles, silica fine particles and titanium oxide fine particles are preferable for improving fluidity and uniformizing charging. The inorganic fine particles are preferably hydrophobized with a hydrophobing agent such as a silane compound, silicone oil, or a mixture thereof, from the viewpoint of improving adhesion to the toner base particles.

From the viewpoint of improving fluidity, the inorganic fine particles as an external additive preferably have a specific surface area of 50 $m^2/g$ or more and 400 $m^2/g$ or less. In addition, from the viewpoint of improving duration stability, the inorganic fine particles as an external additive preferably have a specific surface area of 10 $m^2/g$ or more and 50 $m^2/g$ or less. In order to achieve both improved fluidity and duration stability, inorganic fine particles having a specific surface area within the above range may be used in combination.

The content of the external additive is preferably 0.1 parts by mass or more and 10.0 parts by mass or less, based on 100 parts by mass of the toner particle. A known mixer such as a Henschel mixer can be used to mix the toner particle and the external additive.

<Developer>

The toner of the present invention can also be used as a one-component developer, but is preferably mixed with a magnetic carrier to be used as a two-component developer in order to further improve dot reproducibility and to supply stable images over a long period of time.

When the toner is mixed with a magnetic carrier to be used as a two-component developer, the mixing ratio of the magnetic carrier in that case is preferably 2% by mass or more and 15% by mass or less, more preferably 4% by mass or more and 13% by mass or less, as the toner concentration in the two-component developer.

<Magnetic Carrier>

As the magnetic carrier, it is possible to use a generally known carrier such as iron oxide; metal particles such as iron, lithium, calcium, magnesium, nickel, copper, zinc, cobalt, manganese, chromium, strontium, and rare earths, alloy particles thereof, and oxide particles thereof; magnetic materials such as ferrite and magnetite; and magnetic material-dispersed resin carriers (so-called resin carriers) containing a magnetic material and a binder resin that holds that magnetic material in a dispersed state, and magnetic carriers in the form of ferrite or magnetite particles having pores filled with a resin.

As the magnetic carrier, any of the magnetic materials described above may be used directly, or a magnetic material obtained by coating the surface of any of the above magnetic materials as a core with a resin may be used. From the viewpoint of improving the chargeability of the toner, it is preferable to use, as the magnetic carrier, a magnetic material obtained by coating the surface of any of the above magnetic materials as a core with a resin.

The resin for coating the core is not particularly limited, and known resins can be selected and used as long as the above characteristics are not impaired. It is possible to use resins such as (meth)acrylic resins, silicone resins, urethane resins, polyethylene, polyethylene terephthalate, polystyrene, and phenolic resins, or copolymers or polymer mixtures containing these resins. In particular, it is preferable to use a (meth)acrylic resin or a silicone resin, from the viewpoint of chargeability and prevention of adhesion of foreign matter to the carrier surface. In particular, a (meth) acrylic resin having an alicyclic hydrocarbon group such as a cyclohexyl group, a cycloheptyl group, a cyclooctyl group, a cyclopentyl group, a cyclobutyl group, or a cyclopropyl group is a particularly preferable form because the surface (coat surface) of the resin coat layer that coats the surface of the magnetic material becomes smooth, and adhesion of toner-derived components, such as binder resins, release agents, and external additives, can be suppressed.

<Method of Producing Toner Particle>

The method of producing toner particle is not particularly limited, and it is possible to use known methods such as the kneading pulverization method, the suspension polymerization method, the dissolution suspension method, the emulsion aggregation method, and the dispersion polymerization method. Among them, the kneading pulverization method is preferable from the viewpoint of controlling the dispersion state of the release agent and the crystalline resin. That is, the toner particle is preferably a pulverized toner particle. The procedure for producing toner by the kneading pulverization method will be described below.

For example, the kneading pulverization method includes a raw material mixing step of mixing a release agent, a crystalline polyester and an amorphous polyester as binder resins, and, if necessary, additional components such as a colorant and a charge control agent, a step of melt-kneading the mixed raw materials to obtain a resin composition, and a step of pulverizing the obtained resin composition to obtain a toner particle.

In the raw material mixing step, as materials constituting the toner particle, for example, predetermined amounts of additional components such as a binder resin, a release agent, and, if necessary, a colorant and a charge control agent are weighed, blended, and mixed.

Examples of the mixing device include a double-cone mixer, a V-type mixer, a drum-type mixer, a super mixer, a Henschel mixer, a Nauta mixer, and Mechano Hybrid (manufactured by NIPPON COKE & ENGINEERING CO., LTD.).

Next, the mixed materials are melt-kneaded to disperse the materials in the binder resin. In the melt-kneading step, a pressure kneader, a batch kneader such as a Banbury mixer, or a continuous kneader can be used, and a single-screw or twin-screw extruder is the mainstream because of its superiority in continuous production. Examples include KTK Type Twin Screw Extruder (manufactured by Kobe Steel, Ltd.), TEM Type Twin Screw Extruder (manufactured by Toshiba Machine Co., Ltd.), PCM Kneader (manufactured by Ikegai Corp.), Twin Screw Extruder (manufactured by K.C.K. Co., Ltd.), Co-Kneader (manufactured by Buss), and Kneadex (manufactured by NIPPON COKE & ENGINEERING CO., LTD.). Furthermore, the resin composition obtained by melt-kneading may be rolled with two rolls or the like and cooled with water or the like in the cooling step.

The cooled resin composition is then pulverized to a desired particle diameter in the pulverization step. The pulverization step carries out coarse pulverization using a pulverizer such as a crusher, a hammer mill, or a feather mill.

After that, fine pulverization is carried out by with, for example, Kryptron System (manufactured by Kawasaki Heavy Industries Ltd.), Super Rotor (manufactured by Nisshin Engineering Inc.), Turbo Mill (manufactured by Turbo Kogyo), or an air jet type fine pulverizer.

Then, if necessary, classification is carried out using a classifier or a sieving machine such as an inertial classification type Elbow-Jet (manufactured by Nittetsu Mining Co., Ltd.), centrifugal classification type Turboplex (manufactured by Hosokawa Micron Corporation), TSP Separator (manufactured by Hosokawa Micron Corporation), or Faculty (manufactured by Hosokawa Micron Corporation).

After that, in order to appropriately cover the toner particle surface with the release agent, it is preferable to heat the toner particle for surface treatment, from the viewpoint of suppressing blooming. For example, the surface treatment apparatus shown in FIG. 2 can be used to carry out surface treatment with hot air.

The surface treatment using the surface treatment apparatus shown in FIG. 2 will be described below.

The mixture supplied in a determined amount by a raw material determined amount supply means 11 is guided by the compressed gas adjusted by a compressed gas adjustment means 12 to an introduction pipe 13 installed on the vertical line of the raw material supply means. The mixture that has passed through the introduction pipe is uniformly dispersed by a conical protruding member 14 provided in the center of the raw material supply means, guided to a radially extending eight-way feed pipe 15, and guided to a treatment chamber 16 where heat treatment takes place.

At this time, the mixture supplied to the treatment chamber 16 is regulated in its flow by a regulating means 19 provided in the treatment chamber 16 for regulating the flow of the mixture. Therefore, the mixture supplied to the treatment chamber is heat-treated while swirling in the treatment chamber 16 and then cooled.

Hot air for heat-treating the supplied mixture is supplied from a hot air supply means 17, and is helically swirled and introduced into the treatment chamber 16 by a swirling member 23 for swirling the hot air. As for the configuration, the swirling member 23 for swirling hot air includes multiple blades, and the swirling of the hot air can be controlled by the number and angle of the blades.

The hot air supplied into the treatment chamber 16 preferably has a temperature of 100° C. to 300° C. at the outlet of the hot air supply means 17. When the temperature at the outlet of the hot air supply means is within the above range, it is possible to uniformly spheroidize the toner particle while preventing fusion and coalescence of individual particles of the toner particle due to excessive heating of the mixture.

Further, the heat-treated toner particle is cooled by cold air supplied from a cold air supply means 18. The temperature supplied from the cold air supply means 18 is preferably −20° C. to 30° C. When the temperature of the cold air is within the above range, the heat-treated toner particle can be efficiently cooled, so that fusion and coalescence of the heat-treated toner particle can be prevented without impeding uniform spheroidization of the mixture. The absolute water content of the cold air is preferably 0.5 $g/m^3$ or more and 15.0 $g/m^3$ or less.

The cooled, heat-treated toner particle is then collected by a collection means 20 at the lower end of the treatment chamber 16. Note that the collecting means 20 includes a blower (not shown) provided at an end thereof, and it suction-conveys the mixture.

Further, a powder particle supply port 24 is provided so that the swirling direction of the supplied mixture and the swirling direction of the hot air are the same, and the collection means 20 of the surface treatment apparatus is provided at the outer peripheral portion of the treatment chamber 16 so as to maintain the swirling direction of the swirled powder particles. Furthermore, the configuration is such that the cold air supplied from the cold air supply means 18 is supplied horizontally and tangentially from the outer peripheral portion of the apparatus to the inner peripheral surface of the treatment chamber.

The swirling direction of the toner particle supplied from the powder supply port, the swirling direction of the cold air supplied from the cold air supply means 18, and the swirling direction of the hot air supplied from the hot air supply means 17 are all in the same direction.

As a result, no turbulent flow occurs in the treatment chamber 16, and thus the swirling flow in the apparatus is strengthened to apply a strong centrifugal force to the toner particle, further improving the dispersibility of the toner particle. This therefore makes it possible to obtain a uniformly shaped toner particle with few coalesced particles.

Note that when the average circularity of the toner particle is 0.950 or more and 0.980 or less, the toner particle surface is moderately easily covered with the release agent.

After that, the surface of the toner particle is externally added with an external additive such as silica fine particles to obtain a toner.

Examples of methods for externally adding external additives include a method in which the classified toner and various known external additives are blended in predetermined amounts, and stirred and mixed using a mixing device as an external adder, such as a double-cone mixer, a V-type mixer, a drum-type mixer, a super mixer, a Henschel mixer, a Nauta mixer, Mechano Hybrid (manufactured by NIPPON COKE & ENGINEERING CO., LTD.), or Nobilta (manufactured by Hosokawa Micron Corporation).

[Method of Measuring Physical Property Values]

An example of a method of measuring various physical property values related to the present invention will be described.

<Method of Measuring Weight Average Particle Diameter (D4) of Toner Particle>

The weight average particle diameter (D4) of the toner particle is calculated by analyzing measurement data obtained from measurements with 25000 effective measurement channels, with use of a precision particle size distribution measuring device "Coulter Counter Multisizer 3" (registered trademark, manufactured by Beckman Coulter, Inc.) by virtue of the pore electrical resistance method equipped with a 100 μm aperture tube, and the attached dedicated software "Beckman Coulter Multisizer 3 Version 3.51" (manufactured by Beckman Coulter, Inc.) for setting measurement conditions and analyzing measurement data.

As the electrolytic aqueous solution used for the measurements, it is possible to use special-grade sodium chloride dissolved in ion-exchanged water to a concentration of about 1% by mass, such as "ISOTON II" (manufactured by Beckman Coulter, Inc.).

Note that before carrying out measurements and analysis, the dedicated software is configured as follows.

In the "Change Standard Measurement Method (SOM) Screen" of the dedicated software, the total number of counts in the control mode is set to 50000 particles, the number of measurements is set to 1, and the Kd value is set to the value obtained using "Standard Particles 10.0 μm" (manufactured by Beckman Coulter, Inc.). By pressing the threshold/noise level measurement button, the threshold and noise level are automatically set. Also, the current is set to 1600 μA, the gain to 2, the electrolyte to ISOTON II, and the flash of aperture tube after measurement is checked.

In the "Pulse-to-Particle Diameter Conversion Setting Screen" of the dedicated software, the bin interval is set to logarithmic particle diameter, the particle diameter bin to 256 particle diameter bins, and the particle diameter range to 2 μm or more and 60 μm or less.

A specific measuring method is as follows.

(1) Put about 200 ml of the electrolytic aqueous solution into a 250 ml round-bottom glass beaker dedicated to Multisizer 3, set it on a sample stand, and stir the stirrer rod counterclockwise at 24 rotations/sec. Then, use the analysis software's "Aperture Flush" function to remove dirt and air bubbles inside the aperture tube.

(2) Put about 30 ml of the electrolytic aqueous solution in a 100 ml flat-bottom glass beaker, and add about 0.3 ml of a diluted solution obtained by diluting "Contaminon N" 3 times by mass with deionized water as a dispersant (a 10% by mass aqueous solution of a neutral detergent for washing precision measuring instruments with a pH of 7, composed of a nonionic surfactant, an anionic surfactant, and an organic builder, manufactured by Wako Pure Chemical Industries, Ltd.) therein.

(3) Build in 2 oscillators with an oscillation frequency of 50 kHz with a phase shift of 180 degrees, put a predetermined amount of ion-exchanged water in the water bath of an ultrasonic dispersion device with an electrical output of 120 W "Ultrasonic Dispension System Tetora 150" (manufactured by Nikkaki Bios Co. Ltd.), and add about 2 ml of Contaminon N to this water bath.

(4) Set the beaker of (2) in the beaker fixing hole of the ultrasonic dispersion device to operate the ultrasonic dispersion device. Then, adjust the height position of the beaker so as to maximize the resonance state of the liquid level of the electrolytic aqueous solution in the beaker.

(5) While irradiating the electrolytic aqueous solution in the beaker in (4) above with ultrasonic waves, add about 10 mg of toner little by little to the electrolytic aqueous solution and disperse it. Then, continue the ultrasonic dispersion treatment for another 60 seconds. Note that in the ultrasonic dispersion, the temperature of the water in the water bath is appropriately adjusted to 10° C. or higher and 40° C. or lower.

(6) To the round-bottom glass beaker of (1) set in the sample stand, add dropwise the electrolytic aqueous solution of (5) above having the toner dispersed therein using a pipette, and adjust the measured concentration to about 5%. Then, continue the measurement until the number of measured particles reaches 50000.

(7) Analyze the measurement data with the dedicated software attached to the apparatus, and calculate the weight average particle diameter (D4). Note that the "Average Diameter" on the analysis/volume statistical value (arithmetic mean) screen when graph/vol % is set on the dedicated software is the weight average particle diameter (D4).

<Method of Calculating SP Value of Resin>

The SP values of the amorphous resin, the crystalline resin, and the release agent are obtained as follows according to the calculation method proposed by Fedors.

For the monomer unit from each polymerizable monomer, evaporation energies (Δei) (cal/mol) and molar volumes (Δvi) ($cm^3$/mol) are determined for atoms or atomic groups in the molecular structure using tables given in "Polym. Eng. Sci., 14(2), 147-154 (1974)", and $2.0455\times(\Sigma\Delta ei/\Sigma\Delta vi)^{0.5}$ is determined as SP value $(J/cm^3)^{0.5}$.

<Measurement of Weight Average Molecular Weight of Crystalline Resin by GPC>

The weight average molecular weight (Mw) of the crystalline resin was measured by gel permeation chromatography (GPC) as follows. First, the crystalline resin was dissolved in o-dichlorobenzene at 100° C. for 1 hour. Then, the resulting solution was filtered through a solvent-resistant membrane filter "Maeshori Disk" (manufactured by Tosoh Corporation) having a pore diameter of 0.2 μm to obtain a sample solution. Note that the sample solution was adjusted so that the concentration of components soluble in o-dichlorobenzene was about 0.1% by mass. This sample solution is used for measurement under the following conditions.

Apparatus: HLC-8121GPC/HT (manufactured by Tosoh Corporation)

Column: TSKgel GMHHR-H HT (7.8 cm I.D×30 cm) 2 rows (manufactured by Tosoh Corporation)

Detector: RI for high temperature

Temperature: 135° C.

Solvent: o-dichlorobenzene

Flow rate: 1.0 mL/min

Sample: 0.4 mL of 0.1% sample was injected

A molecular weight calibration curve prepared using a standard polystyrene resin (for example, trade name "TSK Standard Polystyrene F-850, F-450, F-288, F-128, F-80, F-40, F-20, F-10, F-4, F-2, F-1, A-5000, A-2500, A-1000, and A-500", manufactured by Tosoh Corporation) is used to calculate the molecular weight of the sample. Furthermore, it is calculated by converting to polyethylene using a conversion formula derived from the Mark-Houwink viscosity formula.

<Method of Observing Cross-Sections of Ruthenium-Stained Toner Particle with Scanning Transmission Electron Microscope (STEM)>

Cross-sectional observation of a toner particle with a scanning transmission electron microscope (STEM) can be carried out as follows.

The cross-section of a toner particle is ruthenium-stained for observation. The crystalline polyester and release agent contained in the toner have crystallinity, and thus are more dyed with ruthenium than an amorphous resin is such as a binder resin. Therefore, the contrast becomes clear and observation becomes easy. Since the quantity of ruthenium atoms varies depending on the intensity of staining, strongly stained portions contain many of these atoms and do not transmit electron beams, resulting in black on an observation image, and weakly stained portions allow electron beams to easily transmit therethrough, and resulting in white on an observation image.

First, the toner is spread in a single layer on a cover glass (Matsunami Glass Ind., Ltd., corner cover glass square No. 1), and an osmium plasma coater (Filgen, OPC80T) is used to apply an Os film (5 nm) and a naphthalene film (20 nm) to the toner particle as a protective film. Next, a PTFE tube (φ1.5 mm×φ3 mm×3 mm) is filled with a photocurable resin D800 (JEOL Ltd.), and the cover glass is gently placed on the tube in an orientation such that the toner particle is in contact with the photocurable resin D800. In this state, the resin is irradiated with light for curing, and then the cover glass and the tube are removed to form a cylindrical resin in which the toner particle is embedded on the outermost surface. Ultrasonic Ultramicrotome (Leica, UC7) is used to cut the outermost surface of the cylindrical resin by the length of the radius of the toner (4.0 μm if the weight average particle diameter (D4) is 8.0 μm) at a cutting rate of 0.6 mm/s to expose the cross-section of the toner particle. Next, it was cut so as to have a film thickness of 250 nm to prepare a thin cross-section sample of the toner particle. By cutting in such a manner, a cross section of the central portion of the toner particle can be obtained.

The thin sample thus obtained was dyed for 15 minutes in a $RuO_4$ gas atmosphere of 500 Pa using a vacuum electronic dyeing apparatus (Filgen, VSC4R1H), and subjected to STEM observation using the STEM function of a scanning transmission electron microscope (JEOL, JEM 2800).

Images were obtained with a STEM probe size of 1 nm and an image size of 1024×1024 pixels. In addition, the Contrast of the Detector Control panel of bright-field images was adjusted to 1425, the Brightness to 3750, the Contrast of the Image Control panel to 0.0, the Brightness to 0.5, and the Gamma to 1.00 to obtain images.

<Measurement of Maximum Diameter of Domains a of Release Agent>

The domain diameter of the release agent is measured based on a STEM image obtained by observing the cross-section of the ruthenium-stained toner particle with a scanning transmission electron microscope (STEM), and the maximum diameter of the domain having the largest area among domains A of the release agent is measured.

The cross-sections of 100 particles of the toner particle are observed, and the arithmetic mean value thereof is taken as the maximum diameter of domains A of the release agent.

Suppose that the cross-section of the toner particle to be observed has a major axis R (μm) that satisfies the relationship $0.9 \leq R/D4 \leq 1.1$ for the weight average particle diameter (D4).

<Measurement of Average Coverage (Cc) of Crystalline Resin for Release Agent Domains A>

The coverage was calculated as follows using a STEM image of the cross-section of a toner particle in a particle group composed of a toner particle (Tcw) containing the domains of crystalline resin and release agent. First, in STEM observation, the release agent domain having the largest diameter (the domain with the largest area among the domains of the release agent) was specified, and the peripheral length (L1) was measured freehand along the interface of the domain. Next, the length (L2) of the domain portion of the release agent in contact with the crystalline resin was also measured freehand. These values can be used to calculate the coverage from the following formula.

$$\text{Coverage (\%)} = L2/L1 \times 100$$

Similar calculations were carried out for 100 cross-sections of the toner particle having a major axis R (μm) that satisfies the relationship $0.9 \leq R/D4 \leq 1.1$, and the arithmetic mean value thereof was taken as the average coverage (Cc) of the crystalline resin for the release agent domains.

<Measurement of Area Ratio of Crystalline Resin Domains B to Release Agent Domains A>

The area ratio of crystalline resin domains B to release agent domains A is measured by binarizing images (bright-field images) obtained by the same STEM observation as above for the toner particle cross-section group having a major axis R (μm) that satisfies the relationship $0.9 \leq R/D4 \leq 1.1$, using image processing software "Image J 1.48".

First, in order to distinguish crystalline resin domains from the release agent having the largest area among the release agent domains A in the toner particle, the threshold value for brightness (tone 255) is set and binarized, and the areas of the release agent domains A (including the areas of the crystalline resin domains contained therein) and the areas of the crystalline resin domains B contained therein are obtained, and the area ratio thereof is calculated.

The 100 cross-sections of the toner particle having a major axis R (μm) that satisfies the relationship of 0.9≤R/D4≤1.1 were binarized and digitized, and the average value thereof was taken as the area ratio.

<Method for Separating Crystalline Resin Composition from Toner>

The crystalline resin composition in the toner particle is fractionated by separating an extract using N,N-dimethylformamide by the solvent gradient elution method. An example of the operation method is shown below.

| | |
|---|---|
| Toner | 1.0 g |
| N,N-dimethylformamide | 100.0 g |

The above mixture was put into a vessel and heated and stirred at 120° C. for 30 minutes. The resulting mixture was cooled to room temperature, the solid phase component was filtered off, and the solvent in the liquid phase was distilled off under reduced pressure. The solid obtained from the liquid phase was dissolved in THF to a concentration of 0.1% by mass, and the resulting solution was filtered through a solvent-resistant membrane filter "Maeshori Disk" (manufactured by Tosoh Corporation) having a pore diameter of 0.2 μm to obtain a sample for isolation.

Gradient preparative HPLC (LC-20AP High-Pressure Gradient Preparative System manufactured by Shimadzu Corporation, SunFire Prep Column 50 mm φ250 mm manufactured by Waters) is used for the solvent gradient elution method. The column temperature is 30° C., the flow rate is 50 mL/min, and acetonitrile is used as the poor solvent and tetrahydrofuran as the good solvent as the mobile phase. The mobile phase starts with a composition of 100% acetonitrile, and 5 minutes after the injection of the separation sample, increases the proportion of tetrahydrofuran by 4% per minute, until the composition of the mobile phase reaches 100% tetrahydrofuran over 25 minutes. The solvent of the resulting fragments can be distilled off under reduced pressure to separate the resin components in the toner. Which of the fragment components is the crystalline resin is determined as follows.

The endothermic amount of the resulting resin components was measured using a differential scanning calorimeter "Q2000" (manufactured by TA Instruments). The melting points of indium and zinc were used to correct the temperature of the detection unit of the device, and the heat of fusion of indium was used to correct the amount of heat. Specifically, 3 mg of the sample was precisely weighed and placed in an aluminum pan, and an empty aluminum pan was used as a reference for measurement under the following conditions. The temperature was raised from 20° C. to 180° C. at a rate of temperature rise of 10° C./min, and held at 180° C. for 10 minutes. Subsequently, the temperature was lowered to 20° C. at a rate of temperature fall of 10° C./min, and thereafter the temperature was raised again to 180° C. at a rate of temperature rise of 10° C./min.

A resin sample having an endothermic peak in the region of 70° C. or higher was obtained as a crystalline resin composition during the second temperature rise process. If there was more than one HPLC fragment giving the resin sample in question, the mixture of all of them was taken as the "crystalline resin composition".

<Method for Measuring Visible Light Transmittance of Crystalline Resin Composition>

The crystalline resin pulverized into powder was filled in a vessel (the thickness of the inner space filled with the measurement sample was 1 mm), heated to 120° C., and held for 15 minutes to melt the crystalline resin. The inside of the vessel was evacuated while maintaining the above temperature, and a visible light transmittance meter (DST2501, manufactured by Toa System Ltd.) was used to measure the visible light transmittance Ts (%). As the material of the vessel, it is possible to use a material that does not absorb or scatter in the visible light range and can withstand heating, such as quartz.

The same measurement was carried out without the vessel filled with anything, and the visible light transmittance Tb (%) was measured. As the vessel, it is possible to use one with a material and size having a Tb of 95% or more.

T, calculated by the following formula, was defined as the visible light transmittance Tc (%) of the heat-melted crystalline resin.

$$T=Ts/Tb\times100$$

<Separation of Release Agent from Toner>

Separation of the release agent from the toner is carried out by using the difference in solubility in the solvent. An example thereof is shown.

First separation: The toner is dissolved in N,N-dimethylformamide at 120° C., and insoluble matter is separated by filtration. The solvent is distilled off under reduced pressure to obtain soluble components.

Second separation: The soluble components obtained in the first separation are dissolved in chloroform at 23° C., and the insoluble matter is separated by filtration. The insoluble matter is washed with chloroform at 23° C. to obtain the release agent.

<Measurement of Melting Peak Temperature (Melting Point) (° C.)>

The melting point is measured using a differential scanning calorimeter (DSC) Q2000 (manufactured by TA Instruments) under the following conditions.

(i) A first process of raising the temperature from 20° C. to 180° C. at a rate of temperature rise of 10° C./min.

(ii) Following the first process, a second process of lowering the temperature from 180° C. to 20° C. at a rate of temperature fall of 10° C./min.

(iii) Following the second process, a third process of raising the temperature from 20° C. to 180° C. at a rate of temperature rise of 10° C./min.

The melting points of indium and zinc are used to correct the temperature of the detection unit of the device, and the heat of fusion of indium is used to correct the amount of heat.

Specifically, 3 mg of the sample (such as crystalline resin or toner) is precisely weighed and placed in an aluminum pan, and an empty aluminum pan is used as a reference. In the third process, the peak temperature of the maximum endothermic peak of the temperature-endothermic curve in the range of 70 to 120° C. is taken as the melting point.

<Method for Measuring Half Width of Endothermic Peak Derived from Crystalline Resin in Toner>

A differential scanning calorimeter (DSC) Q2000 (manufactured by TA Instruments) is used to measure the endothermic peak and endothermic amount of the toner and resin. The DSC is operated under the same conditions as the measurement of the melting peak temperature above.

Specifically, about 5 mg of the sample is accurately weighed, placed in an aluminum pan, and subjected to differential scanning calorimetry. An empty silver pan is used as a reference.

The measurement of the half width of the endothermic peak uses the toner as a sample, and uses the temperature-endothermic curve obtained in the first temperature rise process in the above "Measurement of Melting Peak Temperature (Melting Point) (° C.)". The comparison with the DSC measurement of the crystalline resin composition separated from the toner by the above method is used as a basis to identify the endothermic peak derived from the crystalline resin in the temperature-endothermic curve. If the peaks of the crystalline resin and the release agent overlap, curve fitting is carried out to isolate these peaks, and the comparison with the peak of the release agent alone separated from the toner is used to remove the peak of the release agent, thereby obtaining an endothermic peak derived from the crystalline resin. For the aforementioned endothermic peak, a straight line is drawn as a baseline. The difference between the amount of heat absorbed at the midpoint thereof and the amount of heat absorbed at the peak top is denoted by d. For the points where the difference from the endothermic amount at the peak top is d/2, the temperatures at minimum and maximum are denoted by Tb and Tu, respectively. With this setup, Tw1 defined by the following formula was taken as the half width of the endothermic peak derived from the crystalline resin in the first temperature rise process:

$$Tw1=Tu-Tb.$$

For the second temperature rise process, the same analysis was carried out to measure Tw2.

<Method for Measuring Softening Point of Amorphous Resin>

The softening point of the resin is measured using a constant-load extrusion type capillary rheometer "Flow Property Evaluation Device Flowtester CFT-500D" (manufactured by Shimadzu Corporation) according to the manual attached to the device. This device heats and melts the measurement sample filled in the cylinder while applying a constant load from above the measurement sample by means of a piston, and extrudes the molten measurement sample through a die at the bottom of the cylinder, making it possible to obtain a flow curve showing the relationship between the amount of piston descent and the temperature at this time.

In the present invention, the softening point is the "Melting Temperature in the ½ Method" described in the manual attached to the "Flow Property Evaluation Device Flowtester CFT-500D". Note that the melting temperature in the ½ method is calculated as follows. First, ½ of the difference between the amount of piston descent Smax when the outflow ends and the amount of piston descent Smin when the outflow starts is obtained (defined as X, X=(Smax−Smin)/2). The temperature of the flow curve when the amount of piston descent is X in the flow curve is the melting temperature in the ½ method.

The measurement sample is resin at about 1.0 g, which is compressed and molded for about 60 seconds at about 10 MPa using a tableting press (for example, NT-100H, manufactured by NPa SYSTEM CO., LTD.) in an environment of 25° C. to form a cylindrical shape with a diameter of about 8 mm.

The measurement conditions for CFT-500D are as follows.

Test mode: temperature rise method
Start temperature: 50° C.
Final temperature: 200° C.
Measurement interval: 1.0° C.
Rate of temperature rise: 4.0° C./min
Piston cross-sectional area: 1.000 $cm^2$
Test load (piston load): 10.0 kgf (0.9807 MPa)
Preheating time: 300 seconds
Die hole diameter: 1.0 mm
Die length: 1.0 mm

[Configurations Included in Embodiments of Present Invention]

The disclosure of the present embodiments includes the following configurations.

(Configuration 1) A toner including:

a toner particle containing a binder resin and a release agent, in which the binder resin contains an amorphous resin and a crystalline resin, and a content of the crystalline resin is 1.0% by mass or more and 20.0% by mass or less based on a mass of the binder resin, and in a cross-section of the toner particle observed by scanning transmission electron microscopy, (i) there exist a matrix A of the amorphous resin and domains A of the release agent dispersed in the matrix A, (ii) the domains A each include a matrix B of the release agent and domains B of the crystalline resin dispersed in the matrix B, and (iii) the domains A are each covered with the crystalline resin, and an average coverage of the domains A by the crystalline resin is 70% or more, and a difference between a melting point of the release agent and a melting point of the crystalline resin is 0° C. or more and 10° C. or less, and a visible light transmittance per 1 mm optical path length of a heat-melted crystalline resin composition obtained by separation operation of an N,N-dimethylformamide soluble fraction of the toner particle by a solvent gradient elution method is 90% or more.

(Configuration 2) The toner according to Configuration 1, in which there exists an endothermic peak derived from the crystalline resin in a temperature-endothermic curve measured using a differential scanning calorimeter (DSC) at a rate of temperature rise and a rate of temperature fall of both 10° C./min, and when a half width of the endothermic peak derived from the crystalline resin in a first temperature rise process is denoted by tw1, and a half width of the endothermic peak derived from the crystalline resin in a second temperature rise process is denoted by tw2, tw1 and tw2 satisfy the following formula:

$$tw2 \geq tw1.$$

(Configuration 3) The toner according to Configuration 2, in which the tw1 and the tw2 satisfy the following formula:

$$tw2/tw1 \geq 1.20.$$

(Configuration 4) The toner according to any one of Configurations 1 to 3, in which when an SP value $[(J/cm^3)^{0.5}]$ of the crystalline resin is denoted by SPc, and an SP value $[(J/cm^3)^{0.5}]$ of the release agent is denoted by SPw, SPc and SPw satisfy the following formula:

$$SPc-SPw \leq 5.11.$$

(Configuration 5) The toner according to any one of Configurations 1 to 4, in which an average area ratio of the crystalline resin in the domains A of the release agent is 10% or more and 50% or less, as observed by scanning transmission electron microscopy.

(Configuration 6) The toner according to any one of Configurations 1 to 5, in which a content of the crystalline resin is 5.0% by mass or more and 15.0% by mass or less.

(Configuration 7) The toner according to Configuration 4, in which the binder resin contains amorphous resin A1, amorphous resin A2, and amorphous resin A3, and when an SP value of A1 is denoted by SP1, an SP value of A2 is denoted by SP2, and an SP value of A3 is denoted by SP3, the following formulas are satisfied:

$$2.05 \leq SP1 - SPc \leq 2.86$$

$$0.20 \leq SP2 - SP1 \leq 0.61$$

$$0.20 \leq SP3 - SP2 \leq 0.61.$$

(Configuration 8) The toner according to any one of Configurations 1 to 7, in which both the amorphous resin and the crystalline resin are polyester resins.

(Configuration 9) The toner according to any one of Configurations 1 to 8, in which the release agent is a hydrocarbon wax.

(Configuration 10) A method of producing a toner that produces the toner according to any one of Configurations 1 to 9, the production method including: a kneading step of melt-kneading a material containing the amorphous resin and the crystalline resin as well as the release agent to obtain a melt-kneaded product; and a pulverization step of pulverizing the melt-kneaded product to obtain powder.

EXAMPLES

Examples are given below to explain the effects of the present invention. Materials, additives, amounts used and concentrations, and treatment methods/procedures shown in the following Examples can be appropriately modified without departing from the scope of the present invention. Therefore, the scope of the present invention should not be interpreted restrictively by the contents of the Examples.

Production Example of Crystalline Resin C1

Ethylene glycol: 18.8 parts by mass
Tetradecanedioic acid: 76.4 parts by mass
Behenic acid: 4.8 parts by mass
Titanium tetrabutoxide (esterification catalyst): 0.5 parts by mass The above materials were weighed into a reactor equipped with a condenser, stirrer, nitrogen introduction pipe, and thermocouple. Next, after the inside of the flask was replaced with nitrogen gas, the temperature was gradually raised while stirring, and the reaction was carried out for 2 hours while stirring at a temperature of 200° C.

Further, the pressure inside the reactor was lowered to 8.3 kPa, and the reaction was carried out for 5 hours while maintaining the temperature at 200° C., and then the reaction was stopped by lowering the temperature to obtain Crystalline Resin C1, which was a crystalline polyester resin. The resulting crystalline resin C1 had a weight average molecular weight Mw of 25000 and a melting point Mpc of 92.0° C.

The SP value of the above polymer was calculated by the above method, and SPc was 20.05 $(J/cm^3)^{0.5}$.

Production Examples of Crystalline Resins C2 to C10

Crystalline Resins C2 to C10, which were crystalline polyester resins, were obtained in the same manner as in the production example of Crystalline Resin C1, except that the respective monomers and parts were changed as shown in Table 1. Table 1 shows physical properties thereof.

TABLE 1

| | Monomer 1 | | | Monomer 2 | | | Monomer 3 | | | | |
|---|---|---|---|---|---|---|---|---|---|---|---|
| Crystalline Resin | Name | Parts | Molar Ratio | Name | Parts | Molar Ratio | Name | Parts | Molar Ratio | SPc | Mpc |
| C1 | ED | 18.8 | 49.40 | TDA | 76.4 | 48.19 | BhA | 4.8 | 2.41 | 20.05 | 92 |
| C2 | ED | 22.7 | 49.51 | DA | 72.6 | 48.54 | BhA | 4.7 | 1.94 | 20.72 | 89 |
| C3 | ED | 17.3 | 49.33 | HDA | 77.8 | 48.00 | BhA | 4.9 | 2.67 | 19.80 | 94 |
| C4 | ED | 25.3 | 49.54 | OA | 69.7 | 48.62 | BhA | 4.9 | 1.83 | 21.05 | 87 |
| C5 | ED | 28.7 | 49.61 | HA | 66.5 | 48.82 | BhA | 4.8 | 1.57 | 21.74 | 91 |
| C6 | ED | 33.1 | 49.67 | BA | 62.2 | 49.01 | BhA | 4.6 | 1.32 | 22.83 | 93 |
| C7 | HD | 43.4 | 49.51 | DhMA | 51.9 | 48.54 | BhA | 4.7 | 1.94 | 20.27 | 100 |
| C8 | ED | 20.6 | 49.45 | DDA | 74.6 | 48.35 | BhA | 4.8 | 2.20 | 20.35 | 90 |
| C9 | HD | 48.5 | 49.57 | FA | 46.8 | 48.72 | BhA | 4.6 | 1.71 | 20.74 | 103 |
| C10 | DDD | 42.6 | 49.12 | TDA | 52.5 | 47.37 | BhA | 4.9 | 3.51 | 19.14 | 84 |

Note that the meanings of the abbreviations in Table 1 are as follows.

ED: ethylene glycol
HD: hexanediol
DDD: dodecanediol
BA: succinic acid
HA: adipic acid
OA: suberic acid
DA: sebacic acid
DDA: dodecanedioic acid
TDA: tetradecanedioic acid
HDA: hexadecanedioic acid
DhMA: trans-dihydromuconic acid
FA: fumaric acid
BhA: behenic acid

Production Example of Amorphous Resin A1

Bisphenol A propylene oxide 2.2 mol adduct (described as BPA-PO (2.2) in the table): 69.7 parts by mass (52.0 mol %)
Terephthalic acid: 17.5 parts by mass (28.0 mol %)
Adipic acid: 5.5 parts by mass (10.0 mol %)
Titanium tetrabutoxide (esterification catalyst): 0.5 parts by mass The above materials were weighed into a reactor equipped with a condenser, stirrer, nitrogen introduction pipe, and thermocouple.

Next, after the inside of the flask was replaced with nitrogen gas, the temperature was gradually raised while stirring, and the reaction was carried out for 2 hours while stirring at a temperature of 200° C.

Further, the pressure inside the reactor was lowered to 8.3 kPa and maintained for 1 hour, then cooled to 160° C. and returned to atmospheric pressure.

Trimellitic anhydride: 7.2 parts by mass (10.0 mol %)

After that, the above materials were added, the pressure in the reactor was lowered to 8.3 kPa, and the reaction was allowed to proceed while the temperature was maintained at 200° C. The softening point was confirmed to reach the temperature shown in Table 2, and the temperature was lowered to stop the reaction, thereby obtaining Amorphous Resin A1, which was an amorphous polyester resin. Table 2 shows SP values.

Production Examples of Amorphous Resins A2 to A4

Amorphous Resins A2 to A4, which were amorphous polyester resins, were obtained in the same manner as in the production example of Amorphous Resin A1, except that the monomers used were changed as shown in Table 2. Table 2 shows the physical properties of the resulting Amorphous Resins A2 to A4.

Production Example of Amorphous Resin A5

Bisphenol A propylene oxide 2.2 mol adduct (56.0 mol %)
Terephthalic acid: 26.6 parts by mass (43.7 mol %)
Trimellitic anhydride: 0.2 parts by mass (0.3 mol %)
Titanium tetrabutoxide (esterification catalyst): 0.5 parts by mass The above materials were weighed into a reactor equipped with a condenser, stirrer, nitrogen introduction pipe, and thermocouple.

Next, after the inside of the flask was replaced with nitrogen gas, the temperature was gradually raised while stirring, and the reaction was carried out for 3 hours while stirring at a temperature of 200° C. After that, the pressure in the reactor was lowered to 8.3 kPa, and the reaction was allowed to proceed while the temperature was maintained at 200° C. The softening point was confirmed to reach the temperature shown in Table 2, and the temperature was lowered to stop the reaction, thereby obtaining Amorphous Resin A5, which was an amorphous polyester resin. Table 2 shows SP values.

Production Example of Amorphous Resins A6 and A7

Amorphous Resins A6 and A7, which were amorphous polyester resins, were obtained in the same manner as in the production example of Amorphous Resin A5, except that the monomers used were changed as shown in Table 2. Table 2 shows the physical properties of the resulting Amorphous Resins A6 and A7.

TABLE 2

| | Alcohol | | Carboxylic Acid | | | Softening | |
|---|---|---|---|---|---|---|---|
| | BPA-PO (2.2) | BPA-PO (2.5) | Terephthalic Acid | Adipic Acid | Trimellitic Anhydride | Point Tm (° C.) | SP Value |
| A1 | 52.0 | 0.0 | 28.0 | 10.0 | 10.0 | 150.0 | 22.50 |
| A2 | 52.0 | 0.0 | 34.0 | 4.0 | 10.0 | 148.0 | 22.64 |
| A3 | 0.0 | 52.0 | 26.0 | 12.0 | 10.0 | 150.0 | 22.30 |
| A4 | 0.0 | 53.0 | 25.0 | 12.0 | 10.0 | 147.0 | 22.23 |
| A5 | 56.0 | 0.0 | 43.7 | 0.0 | 0.3 | 96.0 | 22.87 |
| A6 | 56.0 | 0.0 | 28.7 | 15.0 | 0.3 | 92.0 | 22.54 |
| A7 | 56.0 | 0.0 | 33.7 | 10.0 | 0.3 | 93.0 | 22.64 |

Note that the meanings of the abbreviations in Table 2 are as follows.

BPA-PO (2.2): Bisphenol A propylene oxide 2.2 mol adduct

BPA-PO (2.5): Bisphenol A propylene oxide 2.5 mole adduct

Production Example of Amorphous Resin A8

Bisphenol A propylene oxide 2.2 mol adduct: 39.8 parts by mass (26.4 mol %)

Bisphenol A ethylene oxide 2.2 mol adduct: 24.2 parts by mass (17.6 mol %)

Ethylene glycol: 1.9 parts by mass (7.5 mol %)

Fumaric acid: 0.2 parts by mass (0.5 mol %)

Terephthalic acid: 30.9 parts by mass (44.0 mol %)

Myristic acid: 2.4 parts by mass (2.5 mol %)

Tin(II) 2-ethylhexanoate: 0.5 parts by mass

The above materials were weighed into a reactor equipped with a condenser, stirrer, nitrogen introduction pipe, and thermocouple.

Next, after the inside of the flask was replaced with nitrogen gas, the temperature was gradually raised while stirring, and the reaction was carried out for 4 hours while stirring at a temperature of 200° C.

Further, the pressure inside the reactor was lowered to 8.3 kPa and maintained for 1 hour, then cooled to 160° C. and returned to atmospheric pressure.

Then, after adding 0.5 parts by mass of dicumyl peroxide, 0.6 parts by mass (1.5 mol %) of methyl methacrylate was added dropwise over 1 hour while stirring. After that, the pressure in the reactor was lowered to 8.3 kPa, and the reaction was allowed to proceed while the temperature was maintained at 200° C. The softening point was confirmed to reach the temperature shown in Table 3, and the temperature was lowered to stop the reaction, thereby obtaining Amorphous Resin A8, which was an amorphous polyester resin. Table 3 shows SP values.

Production Example of Amorphous Resins A9 and A10

Amorphous Resins A9 and A10, which were amorphous polyester resins, were obtained in the same manner as in the production example of Amorphous Resin A8, except that the monomers used were changed as shown in Table 3. Table 3 shows the physical properties of the resulting Amorphous Resins A9 and A10.

TABLE 3

| | Alcohol | | | | | | Softening | |
|---|---|---|---|---|---|---|---|---|
| | BPA-PO | BPA-EO | | Carboxylic Acid | | | Point Tm | |
| | (2.2) | (2.2) | ED | Terephthalic Acid | Fumaric Acid | Myristic Acid | (° C.) | SP Value |
| A8 | 26.4 | 17.6 | 7.5 | 44.0 | 0.5 | 2.5 | 106 | 23.13 |
| A9 | 44.0 | 0 | 7.5 | 44.0 | 0.5 | 2.5 | 104 | 23.58 |
| A10 | 30.9 | 20.6 | 0 | 44.0 | 0.5 | 2.5 | 109 | 23.05 |

Note that the meanings of the abbreviations in Table 3 are as follows.

BPA-PO (2.2): Bisphenol A propylene oxide 2.2 mol adduct

BPA-EO (2.2): Bisphenol A ethylene oxide 2.2 mol adduct

ED: ethylene glycol

Production Example of Wax Dispersant

Low-molecular-weight polypropylene (Viscol 660P manufactured by Sanyo Chemical Industries, Ltd.): 10.0 parts by mass (2.4 mol % based on the total number of moles of the constituent monomers (based on the number of moles calculated using the value of the number average molecular weight as the molecular weight of 1 mole))

Xylene: 25.0 parts by mass

The above materials were weighed into a reactor equipped with a condenser, stirrer, nitrogen introduction pipe, and thermocouple.

Next, after the inside of the flask was replaced with nitrogen gas, the temperature was gradually raised to 175° C. while stirring.

Styrene: 68.0 parts by mass (0.65 mol; 76.4 mol % based on the total number of moles of the constituent monomers)

Cyclohexyl methacrylate: 5.0 parts by mass (0.03 mol; 3.5 mol % based on the total number of moles of the constituent monomers)

Butyl acrylate: 12.0 parts by mass (0.09 mol; 11.0 mol % based on the total number of moles of the constituent monomers)

Methacrylic acid: 5.0 parts by mass (0.06 mol; 6.8 mol % based on the total number of moles of the constituent monomers)

Xylene: 10.0 parts by mass

Di-t-butyl peroxy-hexahydro terephthalate: 0.5 parts by mass

After that, the above materials were added dropwise over 3 hours, and the mixture was further stirred for 30 minutes. Then, the solvent was distilled off to obtain a wax dispersant having a structure in which vinyl-based resin components and hydrocarbon compounds reacted.

Production Example of Toner 1

Amorphous resin A1: 20 parts by mass

Amorphous resin A5: 20 parts by mass

Amorphous resin A8: 50 parts by mass

Crystalline resin C1: 10 parts by mass

Fischer-Tropsch wax (melting point 90° C.): 6 parts by mass

Wax dispersant: 6 parts by mass

Carbon black: 7 parts by mass

A Henschel mixer (Model FM-75, manufactured by Mitsui Kozan) was used to mix the above materials at a rotation speed of 1500 rpm for a rotation time of 5 minutes, and the mixture was then kneaded with a twin-screw kneader set at a temperature of 130° C. (Model PCM-30, manufactured by Ikegai Corp.). The resulting kneaded product was cooled and coarsely pulverized to 1 mm or less with a hammer mill to obtain a coarsely pulverized product. The resulting coarsely pulverized product was finely pulverized with a mechanical pulverizer (T-250, manufactured by Turbo Kogyo). Further, classification was carried out using Faculty (F-300, manufactured by Hosokawa Micron Corporation). The operating conditions were a classification rotor rotation speed of 11000 rpm and a dispersion rotor rotation speed of 7200 rpm.

Figure 2:
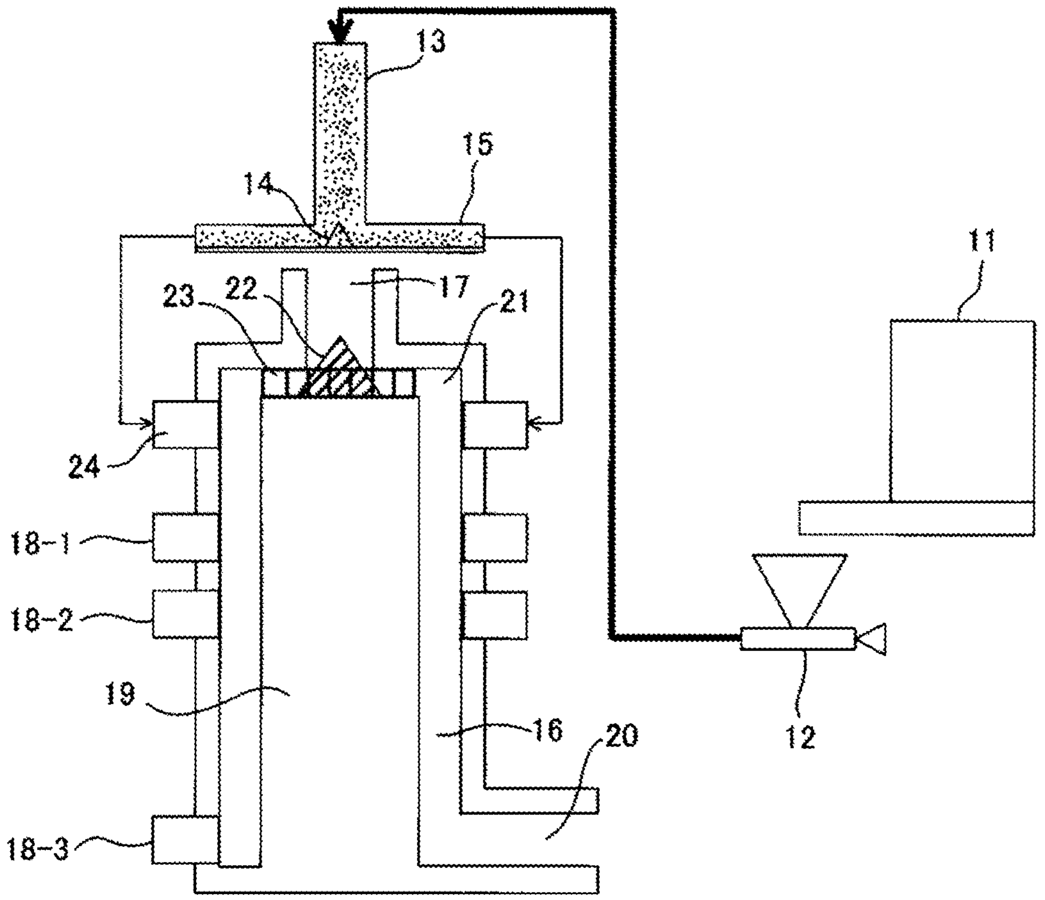
FIG. 2 is a schematic diagram showing an example of a surface treatment apparatus that can be used to produce the toner of the present invention.

The obtained particles were subjected to heat treatment using the heat treatment apparatus shown in FIG. 2 to obtain a toner particle. The operating conditions were such that the feed rate was 5 kg/hr, hot air temperature was 160° C., hot air flow rate was 6 $m^3$/min, cold air temperature was −5° C., cold air flow rate was 4 $m^3$/min, blower air flow rate was 20 $m^3$/min, and injection air flow rate was 1 $m^3$/min.

Toner particle: 100 parts by mass

Silica fine particles: fumed silica surface-treated with hexamethyldisilazane (median diameter (D50) on number basis was 120 nm) 4 parts by mass Small-particle-diameter inorganic fine particles: Titanium oxide fine particles surface-treated with isobutyltrimethoxysilane (median diameter (D50) on number basis was 10 nm) 1 part by mass The above materials were mixed in a Henschel mixer (Model FM-75, manufactured by Mitsui Miike Kakoki) at a rotation speed of 1900 rpm for a rotation time of 10 minutes to obtain Toner 1. Table 5 shows the physical property values obtained.

Production Examples of Toners 2 to 29

Toners 2 to 29 were obtained by carrying out the same operation as in the production example of Toner 1, except that in the production example of Toner 1, the type and amount of amorphous resin added, the type and amount of crystalline resin added, and the amount of release agent added were changed as shown in Table 4. Table 5 shows the physical properties obtained.

TABLE 4

| | Amorphous Resin 1 | | Amorphous Resin 2 | | Amorphous Resin 3 | | Crystalline Resin | | Release Agent | |
|---|---|---|---|---|---|---|---|---|---|---|
| Toner | Type | Parts | Type | Parts | Type | Parts | Type | Parts | Type | Parts |
| 1 | A1 | 20.0 | A5 | 20.0 | A8 | 50.0 | C1 | 10.0 | W1 | 6.0 |
| 2 | A1 | 20.0 | A5 | 20.0 | A8 | 50.0 | C1 | 10.0 | W4 | 6.0 |
| 3 | A2 | 20.0 | A5 | 20.0 | A8 | 50.0 | C1 | 10.0 | W1 | 6.0 |
| 4 | A3 | 20.0 | A5 | 20.0 | A8 | 50.0 | C1 | 10.0 | W1 | 6.0 |
| 5 | A3 | 20.0 | A6 | 20.0 | A8 | 50.0 | C1 | 10.0 | W1 | 6.0 |
| 6 | A2 | 20.0 | A5 | 20.0 | A8 | 50.0 | C1 | 10.0 | W1 | 6.0 |
| 7 | A3 | 20.0 | A5 | 20.0 | A8 | 50.0 | C1 | 10.0 | W1 | 6.0 |
| 8 | A1 | 20.0 | A7 | 20.0 | A8 | 50.0 | C1 | 10.0 | W1 | 6.0 |
| 9 | A4 | 20.0 | A5 | 20.0 | A8 | 50.0 | C1 | 10.0 | W1 | 6.0 |
| 10 | A1 | 20.0 | A5 | 20.0 | A10 | 50.0 | C1 | 10.0 | W1 | 6.0 |
| 11 | A3 | 20.0 | A5 | 20.0 | A9 | 50.0 | C1 | 10.0 | W1 | 6.0 |
| 12 | A3 | 20.0 | A5 | 20.0 | A8 | 50.0 | C8 | 10.0 | W1 | 6.0 |
| 13 | A1 | 20.0 | A5 | 20.0 | A8 | 50.0 | C3 | 10.0 | W1 | 6.0 |
| 14 | A1 | 90.0 | — | 0.0 | — | 0.0 | C1 | 10.0 | W1 | 6.0 |
| 15 | A1 | 21.1 | A5 | 21.1 | A8 | 52.8 | C1 | 5.0 | W1 | 6.0 |
| 16 | A1 | 18.9 | A5 | 18.9 | A8 | 47.2 | C1 | 15.0 | W1 | 6.0 |
| 17 | A1 | 20.0 | A5 | 20.0 | A8 | 50.0 | C2 | 10.0 | W2 | 6.0 |
| 18 | A1 | 20.0 | A5 | 20.0 | A8 | 50.0 | C3 | 10.0 | W1 | 6.0 |
| 19 | A1 | 20.0 | A5 | 20.0 | A8 | 50.0 | C4 | 10.0 | W2 | 6.0 |
| 20 | A1 | 20.0 | A5 | 20.0 | A8 | 50.0 | C5 | 10.0 | W1 | 6.0 |
| 21 | A1 | 20.0 | A5 | 20.0 | A8 | 50.0 | C6 | 10.0 | W1 | 6.0 |
| 22 | A1 | 20.0 | A5 | 20.0 | A8 | 50.0 | C7 | 10.0 | W1 | 6.0 |
| 23 | A1 | 22.0 | A5 | 22.0 | A8 | 55.0 | C1 | 1.0 | W1 | 6.0 |
| 24 | A1 | 17.8 | A5 | 17.8 | A8 | 44.4 | C8 | 20.0 | W1 | 6.0 |
| 25 | A1 | 20.0 | A5 | 20.0 | A8 | 50.0 | C9/C10 | 5.0/5.0 | W3 | 6.0 |
| 26 | A1 | 20.0 | A5 | 20.0 | A8 | 50.0 | C9 | 10.0 | W1 | 6.0 |
| 27 | A1 | 20.0 | A5 | 20.0 | A8 | 50.0 | C10 | 10.0 | W3 | 6.0 |
| 28 | A1 | 22.1 | A5 | 22.1 | A8 | 55.3 | C1 | 0.5 | W1 | 6.0 |
| 29 | A1 | 16.7 | A5 | 16.7 | A8 | 41.7 | C1 | 25.0 | W1 | 6.0 |

Note that the meanings of the abbreviations related to the release agents in the table are as follows.

W1: Fischer-Tropsch wax (melting point 90° C.)
W2: Fischer-Tropsch wax (melting point 85° C.)
W3: Fischer-Tropsch wax (melting point 80° C.)
W4: Dipentaerythritol hexabehenate

TABLE 5

| Toner | Wc | Cc | Mpc | Mpw | Mpc-Mpw | Tc | Tw1 | Tw2 | Tw2/Tw1 | SPc | SPw | SPc-SPw |
|---|---|---|---|---|---|---|---|---|---|---|---|---|
| 1 | 10.0% | 74.5% | 92 | 90 | 2 | 91.8 | 9.31 | 11.6 | 1.25 | 20.05 | 17.00 | 3.05 |
| 2 | 10.0% | 74.7% | 92 | 84 | 8 | 92.4 | 9.33 | 12.1 | 1.30 | 20.05 | 18.16 | 1.89 |
| 3 | 10.0% | 75.4% | 92 | 90 | 2 | 90.8 | 9.32 | 11.4 | 1.22 | 20.05 | 17.00 | 3.05 |
| 4 | 10.0% | 75.3% | 92 | 90 | 2 | 93.2 | 9.34 | 11.6 | 1.24 | 20.05 | 17.00 | 3.05 |
| 5 | 10.0% | 75.2% | 92 | 90 | 2 | 92.5 | 9.34 | 11.6 | 1.24 | 20.05 | 17.00 | 3.05 |
| 6 | 10.0% | 75.5% | 92 | 90 | 2 | 90.7 | 9.33 | 11.2 | 1.20 | 20.05 | 17.00 | 3.05 |
| 7 | 10.0% | 75.7% | 92 | 90 | 2 | 91.5 | 9.35 | 11.3 | 1.21 | 20.05 | 17.00 | 3.05 |
| 8 | 10.0% | 75.1% | 92 | 90 | 2 | 91.7 | 9.31 | 11.0 | 1.18 | 20.05 | 17.00 | 3.05 |
| 9 | 10.0% | 75.3% | 92 | 90 | 2 | 90.8 | 9.33 | 11.4 | 1.22 | 20.05 | 17.00 | 3.05 |
| 10 | 10.0% | 75.6% | 92 | 90 | 2 | 93.1 | 9.35 | 10.9 | 1.17 | 20.05 | 17.00 | 3.05 |
| 11 | 10.0% | 74.8% | 92 | 90 | 2 | 93.4 | 9.32 | 11.2 | 1.20 | 20.05 | 17.00 | 3.05 |
| 12 | 10.0% | 76.4% | 90 | 90 | 0 | 90.6 | 9.33 | 10.8 | 1.16 | 20.35 | 17.00 | 3.05 |
| 13 | 10.0% | 78.4% | 94 | 90 | 4 | 92.9 | 9.35 | 11.2 | 1.19 | 19.80 | 17.00 | 2.80 |
| 14 | 10.0% | 75.0% | 92 | 90 | 2 | 92.8 | 9.27 | 10.8 | 1.16 | 20.05 | 17.00 | 3.05 |
| 15 | 5.0% | 71.8% | 92 | 90 | 2 | 92.1 | 9.31 | 11.0 | 1.18 | 20.05 | 17.00 | 3.05 |
| 16 | 15.0% | 82.5% | 92 | 90 | 2 | 92.2 | 9.32 | 12.2 | 1.31 | 20.05 | 17.00 | 3.05 |
| 17 | 10.0% | 78.5% | 89 | 85 | 4 | 93.0 | 9.52 | 11.5 | 1.21 | 20.72 | 16.83 | 3.89 |
| 18 | 10.0% | 72.6% | 94 | 90 | 4 | 91.3 | 9.25 | 12.3 | 1.33 | 19.80 | 17.00 | 2.80 |
| 19 | 10.0% | 80.0% | 87 | 85 | 2 | 92.7 | 9.22 | 10.9 | 1.18 | 21.05 | 16.83 | 4.22 |
| 20 | 10.0% | 82.3% | 91 | 90 | 1 | 92.5 | 9.18 | 10.6 | 1.15 | 21.74 | 17.00 | 4.74 |
| 21 | 10.0% | 88 00/ | 93 | 90 | 3 | 90.8 | 9.15 | 10.0 | 1.09 | 22.83 | 17.00 | 5.83 |
| 22 | 10.0% | 85.1% | 100 | 90 | 10 | 93.3 | 8.87 | 9.11 | 1.03 | 20.27 | 17.00 | 3.27 |
| 23 | 1.0% | 70.3% | 92 | 90 | 2 | 91.9 | 9.30 | 9.60 | 1.03 | 20.05 | 17.00 | 3.05 |
| 24 | 20.0% | 95.8% | 90 | 90 | 0 | 93.5 | 9.29 | 12.5 | 1.35 | 20.35 | 17.00 | 3.05 |
| 25 | 10.0% | 96.3% | 103/84 | 80 | 23/4 | 72.8 | — | — | — | 20.74/19.14 | 16.73 | 4.01/2.41 |
| 26 | 10.0% | 98.7% | 103 | 90 | 13 | 92.5 | 9.06 | 9.05 | 1.00 | 20.74 | 17.00 | 3.74 |

TABLE 5-continued

| | | | | | | | | | | | |
|---|---|---|---|---|---|---|---|---|---|---|---|
| 27 | 10.0% | 58.2% | 84 | 80 | 4 | 93.0 | 10.4 | 10.2 | 0.98 | 19.14 | 16.73 | 2.41 |
| 28 | 0.5% | 23.9% | 92 | 90 | 2 | 93.1 | 9.15 | 9.18 | 1.00 | 20.05 | 17.00 | 3.05 |
| 29 | 25.0% | 97.6% | 92 | 90 | 2 | 91.1 | 9.42 | 13.5 | 1.43 | 20.05 | 17.00 | 3.05 |

| Toner | Ca | SP1 | SP2 | SP3 | SP1-SPc | SP2-SP1 | SP3-SP2 |
|---|---|---|---|---|---|---|---|
| 1 | 38.9 | 22.50 | 22.87 | 23.13 | 2.45 | 0.37 | 0.27 |
| 2 | 45.6 | 22.50 | 22.87 | 23.13 | 2.45 | 0.37 | 0.27 |
| 3 | 14.5 | 22.64 | 22.87 | 23.13 | 3.00 | 0.23 | 0.27 |
| 4 | 41.9 | 22.30 | 22.87 | 23.13 | 2.25 | 0.57 | 0.27 |
| 5 | 41.5 | 22.30 | 22.54 | 23.13 | 2.25 | 0.25 | 0.59 |
| 6 | 42.3 | 22.64 | 22.87 | 23.13 | 3.00 | 0.23 | 0.27 |
| 7 | 40.8 | 22.30 | 22.87 | 23.13 | 2.25 | 0.57 | 0.27 |
| 8 | 38.5 | 22.50 | 22.64 | 23.13 | 2.45 | 0.14 | 0.49 |
| 9 | 40.7 | 22.23 | 22.87 | 23.13 | 2.19 | 0.63 | 0.27 |
| 10 | 37.1 | 22.50 | 22.87 | 23.05 | 2.45 | 0.37 | 0.18 |
| 11 | 41.0 | 22.50 | 22.87 | 23.58 | 2.25 | 0.57 | 0.72 |
| 12 | 36.5 | 22.50 | 22.87 | 23.13 | 1.94 | 0.57 | 0.27 |
| 13 | 38.4 | 22.50 | 22.87 | 23.13 | 2.70 | 0.37 | 0.27 |
| 14 | 34.2 | 22.50 | — | — | 2.45 | — | — |
| 15 | 22.3 | 22.50 | 22.87 | 23.13 | 2.45 | 0.37 | 0.27 |
| 16 | 48.0 | 22.50 | 22.87 | 23.13 | 2.45 | 0.37 | 0.27 |
| 17 | 10.4 | 22.50 | 22.87 | 23.13 | 1.78 | 0.37 | 0.27 |
| 18 | 49.2 | 22.50 | 22.87 | 23.13 | 2.70 | 0.37 | 0.27 |
| 19 | 8.65 | 22.50 | 22.87 | 23.13 | 1.45 | 0.37 | 0.27 |
| 20 | 7.22 | 22.50 | 22.87 | 23.13 | 0.76 | 0.37 | 0.27 |
| 21 | 5.18 | 22.50 | 22.87 | 23.13 | −0.33 | 0.37 | 0.27 |
| 22 | 16.6 | 22.50 | 22.87 | 23.13 | 2.23 | 0.37 | 0.27 |
| 23 | 5.16 | 22.50 | 22.87 | 23.13 | 2.45 | 0.37 | 0.27 |
| 24 | 50.6 | 22.50 | 22.87 | 23.13 | 2.15 | 0.37 | 0.27 |
| 25 | 35.8 | 22.50 | 22.87 | 23.13 | 2.39/3.99 | 0.37 | 0.27 |
| 26 | 9.57 | 22.50 | 22.87 | 23.13 | 1.76 | 0.37 | 0.27 |
| 27 | 46.9 | 22.50 | 22.87 | 23.13 | 3.35 | 0.37 | 0.27 |
| 28 | 0 | 22.50 | 22.87 | 23.13 | 2.45 | 0.37 | 0.27 |
| 29 | 52.6 | 22.50 | 22.87 | 23.13 | 2.45 | 0.37 | 0.27 |

Production Example of Magnetic Core

Step 1 (Weighing/Mixing Step):

The ferrite raw materials were weighed as follows:

| | |
|---|---|
| $Fe_2O_3$ | 61.7% by mass |
| $MnCO_3$ | 34.2% by mass |
| $Mg(OH)_2$ | 3.0% by mass |
| $SrCO_3$ | 1.1% by mass |

After that, they were pulverized and mixed for 2 hours in a dry ball mill using zirconia (φ10 mm) balls.

Step 2 (Pre-Calcination Step):

After pulverizing and mixing, the mixture was calcined in the atmosphere at 950° C. for 2 hours using a burner-type calcination furnace to prepare pre-calcined ferrite. The composition of the ferrite is as follows.

$$(MnO)_a(MgO)_b(SrO)_c(Fe_2O_3)_d.$$

In the above formula, a=0.40, b=0.07, c=0.01, and d=0.52.

Step 3 (Pulverization Step):

A crusher was used for pulverization to about 0.5 mm, and then 30 parts by mass of water was added to 100 parts by mass of the pre-calcined ferrite using zirconia balls (φ1.0 mm), which was pulverized with a wet ball mill for 2 hours. After the balls were separated, they were pulverized for 3 hours in a wet bead mill using zirconia beads (φ1.0 mm) to obtain a ferrite slurry.

Step 4 (Granulation Step):

To the ferrite slurry, 2.0 parts by mass of polyvinyl alcohol, based on 100 parts by mass of the pre-calcined ferrite, was added as a binder, and the mixture was granulated into spherical particles of 40 μm with a spray dryer (manufacturer: Ohkawara Kakohki Co., Ltd.).

Step 5 (Main Calcination Step):

In order to control the calcination atmosphere, the spherical particles were calcined at 1150° C. for 4 hours in a nitrogen atmosphere (oxygen concentration 1.0% by volume) in an electric furnace.

Step 6 (Sorting Step):

After the aggregated particles were pulverized, they were sieved with a sieve with an opening of 250 μm to remove coarse particles to obtain porous magnetic core particles.

Step 7 (Resin Filling Step):

In a stirring vessel of a mixing stirrer (universal stirrer model NDMV manufactured by Dalton), 100.0 parts by mass of the porous magnetic core particles were placed. Nitrogen was introduced while maintaining the temperature at 60° C. and reducing the pressure to 2.3 kPa. A silicone resin solution was added dropwise to the porous magnetic core particles so that the resin component was 7.5 parts by mass under reduced pressure, and stirring was continued for 2 hours after the dropwise addition. Thereafter, the temperature was raised to 70° C., the solvent was removed under reduced pressure, and the interior of the porous magnetic core particles was filled with the silicone resin composition obtained from the silicone resin solution. After cooling, the resulting packed core particles were transferred into a mixer with spiral blades in a rotatable mixing vessel (Drum Mixer Model UD-AT manufactured by Sugiyama Heavy Industrial Co., Ltd.), and was heated to 220° C. at a rate of temperature rise of 2 (° C./min) in a nitrogen atmosphere and normal pressure. Heating and stirring were carried out at this temperature for 60 minutes to cure the resin. After the heat treatment, low magnetic products were separated by magnetic separation and classified with a sieve having an opening of 150 μm to obtain a magnetic core.

Production Example of Coating Resin

To a four-necked flask equipped with a reflux condenser, thermometer, nitrogen suction tube, and slide stirrer, 80 parts by mass of cyclohexyl methacrylate and 20 parts by mass of methyl methacrylate were added.

Further, 100 parts by mass of toluene, 100 parts by mass of methyl ethyl ketone, and 2.0 parts by mass of azobisisovaleronitrile were added. The resulting mixture was maintained at 70° C. for 10 hours under a nitrogen stream, and after completion of the polymerization reaction, washing was repeated to obtain a coating resin solution (solid content: 35% by mass).

Production Example of Coating Resin Coating Liquid

Toluene and methyl ethyl ketone were added at a ratio of 1:1 to the coating resin solution so that the resin solid content ratio was 5% by mass. The resulting mixture was shaken and stirred for 15 minutes using a paint shaker (manufactured by RADIA) to obtain a coating resin coating liquid.

Production Example of Magnetic Carrier

The magnetic core was used to put the coating resin coating liquid in a planetary motion mixer (Nauta Mixer Model VN manufactured by Hosokawa Micron Corporation) maintained at a temperature of 60° C. under reduced pressure (1.5 kPa) so that the solid content was 3.0 parts by mass based on 100 parts by mass of the magnetic core. As for the putting method, ⅓ of the amount of the resin coating liquid was put, and the solvent removal and coating operations were carried out for 20 minutes. Subsequently, another ⅓ of the amount of the resin coating liquid was put, and solvent removal and coating operations were carried out for 20 minutes, and the last ⅓ of the amount of the resin coating liquid was put, and solvent removal and coating operations were carried out for 20 minutes.

After that, the resulting mixture was transferred into a mixer with spiral blades in a rotatable mixing vessel (Drum Mixer Model UD-AT manufactured by Sugiyama Heavy Industrial Co., Ltd.), and heat-treated at a temperature of 120° C. for 2 hours under a nitrogen atmosphere while stirring by rotating the mixing vessel 10 times per minute. The resulting mixture was subjected to magnetic separation to remove low-magnetic products, passed through a sieve with an opening of 150 μm, and then classified with an air classifier to obtain a magnetic carrier.

Production Example of Two-Component Developer 1

To 90 parts by mass of the magnetic carrier, 10 parts by mass of Toner 1 was added, and the mixture was shaken with a shaker (trade name: Model YS-8D: manufactured by Yayoi) to obtain Two-Component Developer 1. The shaking conditions using a shaker were 200 rpm and 5 minutes.

Production Examples of Two-Component Developers 2 to 29

Two-Component Developers 2 to 29 were obtained in the same manner as in the production example of Two-Component Developer 1, except that the toners used were changed to toners 2 to 29, respectively.

Example 1

As an image forming apparatus, a modified imageRUNNER ADVANCE C5560 digital commercial printer manufactured by Canon was used, and Two-Component Developer 1 was put in the cyan-position developer. The apparatus was modified so as to freely set the fixing temperature, process speed, DC voltage $V_{DC}$ of developer carriers, charging voltage $V_D$ of electrostatic latent image carriers, and laser power. Image output evaluation was carried out as described later by outputting an FFh image (solid image) with a desired image ratio and adjusting $V_{DC}$, $V_D$, and laser power so as to obtain a desired amount of toner applied on the FFh image on paper.

FFh is a value representing 256 tones in hexadecimal, where 00h is the 1st of the 256 tones (white background), and FFh is the 256th of the 256 tones (solid portion).

Evaluation was carried out based on the method described later, and each evaluation was conducted on a four-grade scale from A to D using the criteria described later. Table 6 shows the results. It was judged that the evaluation of the present invention was shown when all the evaluation items were C or higher.

[Abrasion Resistance]

Paper: Coated paper (Image Coat Gloss 158: sold by Canon Marketing Japan Inc.)

Amount of toner on paper: 0.05 mg/cm$^2$ (2Fh image)

(Adjusted by the DC voltage $V_{DC}$ of developer carriers, the charging voltage $V_D$ of electrostatic latent image carriers, and the laser power)

Evaluation image: A 3 m×15 cm image was placed in the center of the above A4 paper Fixing test environment: temperature 23° C./humidity 50% RH Fixing temperature: 180° C.

Process speed: 377 mm/sec

The above evaluation image was outputted to evaluate the abrasion resistance. The value of the difference in reflectance was used as an evaluation index for abrasion resistance.

First, Color Fastness Rubbing Tester (AB-301: manufactured by Tester Sangyo Co., Ltd.) was used to apply a load of 4.9 N (0.5 kgf) to the image portion of the evaluation image, which was rubbed with new evaluation paper (10 reciprocations). After that, a reflectometer (REFLECTOMETER MODEL TC-6DS: manufactured by Tokyo Denshoku Co., Ltd.) was used to measure the reflectance of the rubbed portion of the new evaluation paper and the reflectance of the non-rubbed portion thereof.

Then, the difference in reflectance before and after rubbing was calculated using the following formula. The obtained difference in reflectance was evaluated according to the following evaluation criteria.

Difference in reflectance=reflectance before rubbing−reflectance after rubbing (Evaluation Criteria)

A: less than 1.0%

B: 1.0% or more and less than 2.0%

C: 2.0% or more and less than 4.0%

D: 4.0% or more

[Scratch Resistance]

Paper: Coated paper (Oce Top Coated Pro Silk 270: sold by Oce Japan Corporation)

Evaluation image: a 2 cm×15 cm image was placed in the center of the above A4 paper Amount of toner on paper: 0.70 $mg/cm^2$ (Adjusted by the DC voltage $V_{DC}$ of developer carriers, the charging voltage $V_D$ of electrostatic latent image carriers, and the laser power)

Test environment: Under normal temperature and humidity environment (temperature 23° C. and humidity 50% RH (hereinafter N/N))

Fixing temperature: 180° C.

Process speed: 377 mm/sec

Using Surface Property Tester HEIDON TYPE 14FW manufactured by Shinto Scientific Co., Ltd., a sheet of recording paper, with the above evaluation image printed thereon, was loaded with a weight of 200 g, scratched with a stylus having a diameter of 0.75 mm at a rate of 60 mm/min over a length of 30 mm, and evaluated based on the scratches on the image.

Note that the area ratio of toner release was obtained by binarizing the area of toner release based on the scratched area by image processing.

(Evaluation Criteria)

A: Area ratio of toner released due to image scratches is less than 1.0%

B: Area ratio of toner released due to image scratches is 1.0% or more and less than 4.0%

C: Area ratio of toner released due to image scratches is 4.0% or more and less than 7.0%

D: Area ratio of toner released due to image scratches is 7.0%

[Low-Temperature Fixability]

Paper: High white paper (GFC-081: sold by Canon Marketing Japan Inc.)

Amount of toner on paper: 0.50 $mg/cm^2$ (Adjusted by the DC Voltage $V_{DC}$ of Developer Carriers, the Charging Voltage $V_D$ of Electrostatic Latent Image Carriers, and the Laser Power)

Evaluation image: A 2 cm×5 cm image was placed in the center of the above A4 paper Test environment: temperature 15° C./humidity 10% RH Fixing temperature: 150° C.

Process speed: 377 mm/sec

The above evaluation image was outputted to evaluate the low-temperature fixability. The value of the rate of image density reduction was used as an evaluation index for low-temperature fixability.

The rate of image density reduction was determined by first measuring the image density at the center using X-Rite Color Reflection Densitometer (500 series: manufactured by X-Rite, Inc.). Next, the portion subjected to image density measurement was loaded with a load of 4.9 kPa (50 $g/cm^2$), and the fixed image was rubbed with Silbon paper (5 reciprocations), and the image density was measured again.

Then, the rate of image density reduction before and after rubbing was calculated using the following formula. The rate of image density reduction obtained was evaluated according to the following evaluation criteria.

Rate of image density reduction=(image density before rubbing−image density after rubbing)/image density before rubbing×100

(Evaluation Criteria)

A: The rate of image density reduction is less than 3%

B: The rate of image density reduction is 3% or more and less than 5%

C: The rate of image density reduction is 5% or more and less than 8%

D: The rate of image density reduction is 8% or more

[Charge Retention Rate in High Temperature and High Humidity Environment]

Paper: High white paper (GFC-081: Canon Marketing Japan Inc.)

Amount of toner on paper: 0.35 $mg/cm^2$ (Adjusted by the DC Voltage Vic of Developer Carriers, the Charging Voltage $V_D$ of Electrostatic Latent Image Carriers, and the Laser Power)

Evaluation image: A 2 cm×5 cm image was placed in the center of the above A4 paper Fixing test environment: temperature 30° C./humidity 80% RH Process speed: 377 mm/sec The amount of triboelectrification of the toner was calculated by suction-collecting the toner on the electrostatic latent image carrier using a metal cylindrical tube and a cylindrical filter. Specifically, the amount of triboelectrification of the toner on the electrostatic latent image carrier was measured with a Faraday cage.

A Faraday cage is a coaxial double cylinder in which the inner and outer cylinders are insulated. If a charged body with an electric charge of Q is placed in this inner cylinder, it will be as if a metal cylinder with an electric charge of Q existed due to electrostatic induction. This induced charge was measured with an electrometer (Keithley 6517A manufactured by Keithley), and the charge Q (mC) was divided by the toner mass M (kg) in the inner cylinder (Q/M) to obtain the amount of triboelectrification of the toner.

Amount of triboelectrification of toner (mC/kg)=$Q/M$

First, the above evaluation image was formed on the electrostatic latent image carrier, and the rotation of the electrostatic latent image carrier was stopped before the transfer onto the intermediate transfer member, and the toner on the electrostatic latent image carrier was suction-collected using a metal cylindrical tube and a cylindrical filter, and [initial Q/M] was measured.

Subsequently, the developing device was left in the evaluation machine for two weeks in the H/H environment, and then the same operation as before the leaving to measure the charge Q/M (mC/kg) per unit mass on the electrostatic latent image carrier after the leaving. The initial Q/M per unit mass on the electrostatic latent image carrier was set to 100%, and the retention rate of Q/M per unit mass on the electrostatic latent image carrier after the leaving ([Q/M after leaving]/[initial Q/M]×100) was calculated, and judgements were made according to the following criteria.

(Evaluation Criteria)

A: The retention rate is 95% or more

B: The retention rate is 90% or more and less than 95%

C: The retention rate is 85% or more and less than 90%

D: The retention rate is less than 85%

Examples 2 to 24 and Comparative Examples 1 to 5

Evaluation was carried out in the same manner as in Example 1, except that Two-Component Developer 1 was changed to Two-Component Developers 2 to 31 shown in Table 6. Table 6 shows the results.

TABLE 6

| | Two-Developer Component | Toner | Abrasion Resistance Reflectance Difference | Abrasion Resistance Evaluation | Scratch Resistance Area Ratio of Released Toner | Scratch Resistance Evaluation | Low Temperature Fixability Rate of Image Density Reduction | Low Temperature Fixability Evaluation | Charge Retention Rate Under High Temperature and Humidity Environment Q/M Retention Rate | Charge Retention Rate Under High Temperature and Humidity Environment Evaluation |
|---|---|---|---|---|---|---|---|---|---|---|
| Example 1 | 1 | 1 | 0.4 | A | 0.5 | A | 1.8 | A | 97 | A |
| Example 2 | 2 | 2 | 0.4 | A | 0.6 | A | 1.7 | A | 97 | A |
| Example 3 | 3 | 3 | 1.1 | B | 0.5 | A | 1.9 | A | 98 | A |
| Example 4 | 4 | 4 | 0.6 | A | 0.5 | A | 1.8 | A | 97 | A |
| Example 5 | 5 | 5 | 0.7 | A | 0.6 | A | 1.8 | A | 97 | A |
| Example 6 | 6 | 6 | 1.0 | B | 0.5 | A | 1.8 | A | 97 | A |
| Example 7 | 7 | 7 | 1.1 | B | 0.6 | A | 1.7 | A | 97 | A |
| Example 8 | 8 | 8 | 1.3 | B | 0.6 | A | 1.9 | A | 98 | A |
| Example 9 | 9 | 9 | 1.2 | B | 0.6 | A | 2.0 | A | 96 | A |
| Example 10 | 10 | 10 | 1.2 | B | 0.8 | A | 1.8 | A | 97 | A |
| Example 11 | 11 | 11 | 1.2 | B | 0.7 | A | 1.8 | A | 97 | A |
| Example 12 | 12 | 12 | 1.3 | B | 0.7 | A | 1.9 | A | 97 | A |
| Example 13 | 13 | 13 | 1.2 | B | 0.8 | A | 1.7 | A | 96 | A |
| Example 14 | 14 | 14 | 1.5 | B | 0.9 | A | 1.8 | A | 98 | A |
| Example 15 | 15 | 15 | 2.0 | C | 0.8 | A | 3.9 | B | 95 | A |
| Example 16 | 16 | 16 | 0.9 | A | 1.1 | B | 1.8 | A | 94 | B |
| Example 17 | 17 | 17 | 1.6 | B | 0.9 | A | 1.8 | A | 94 | B |
| Example 18 | 18 | 18 | 1.5 | B | 0.7 | A | 2.4 | A | 93 | B |
| Example 19 | 19 | 19 | 0.9 | A | 0.9 | A | 1.9 | A | 95 | A |
| Example 20 | 20 | 20 | 1.3 | B | 1.2 | B | 3.0 | B | 93 | B |
| Example 21 | 21 | 21 | 2.1 | C | 1.5 | B | 3.8 | B | 93 | B |
| Example 22 | 22 | 22 | 2.6 | C | 0.8 | A | 6.8 | C | 95 | A |
| Example 23 | 23 | 23 | 3.4 | C | 1.9 | B | 7.2 | C | 98 | A |
| Example 24 | 24 | 24 | 0.7 | A | 1.7 | B | 2.0 | A | 88 | C |
| Comparative Example 1 | 27 | 27 | 4.5 | D | 1.9 | B | 2.1 | A | 92 | B |
| Comparative Example 2 | 28 | 28 | 4.2 | D | 1.4 | B | 8.5 | D | 92 | B |
| Comparative Example 3 | 29 | 29 | 4.3 | D | 1.6 | B | 1.6 | A | 91 | B |
| Comparative Example 4 | 30 | 30 | 6.2 | D | 0.8 | A | 9.2 | D | 99 | A |
| Comparative Example 5 | 31 | 31 | 0.8 | A | 2.8 | C | 1.9 | A | 81 | D |

The present invention makes it possible to provide a toner excellent in abrasion resistance, scratch resistance, low-temperature fixability, and charge retention property.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-046564, filed Mar. 23, 2022, Japanese Patent Application No. 2022-204135, filed Dec. 21, 2022 and Japanese Patent Application No. 2023-004802, filed Jan. 17, 2023 which are hereby incorporated by reference herein in their entirety.

What is claimed is:

1. A toner, comprising:

a toner particle containing a binder resin and a release agent;

the binder resin comprising an amorphous resin and a crystalline resin, a content of the crystalline resin being 1.0 to 20.0% by mass based on a mass of the binder resin; and in a cross-section of the toner particle observed by scanning transmission electron microscopy (i) there exists a matrix A of the amorphous resin with domains A of the release agent dispersed therein, (ii) domains A each include a matrix B of the release agent with domains B of the crystalline resin dispersed therein, and (iii) the domains A are each covered with the crystalline resin, and an average coverage of the domains A by the crystalline resin is at least 70%, wherein a melting point difference obtained by subtracting a melting point of the release agent from a melting point of the crystalline resin is 0 to 10° C., and a heat-melted crystalline resin composition obtained by separation operation of an N,N-dimethylformamide soluble fraction of the toner particle by a solvent gradient elution method has a visible light transmittance per 1 mm optical path length of at least 90%, the crystalline resin composition comprising a portion constituting domain B and a portion covering domain A.

2. The toner according to claim 1, wherein there exists an endothermic peak derived from the crystalline resin in a temperature-endothermic curve measured using a differential scanning calorimeter (DSC) at a rate of temperature rise and a rate of temperature fall of both 10° C./min, and tw2>tw1, where tw1 is a half width [° C.] of the endothermic peak derived from the crystalline resin in a first temperature rise process, and tw2 is a half width [° C.] of the endothermic peak derived from the crystalline resin in a second temperature rise process.

3. The toner according to claim 2, wherein tw2/tw1≥1.20.

4. The toner according to claim 1, wherein SPc−SPw≤5.11 when SPc and SPw are respectively SP values $[(J/cm^3)^{0.5}]$ of the crystalline resin and the release agent.

5. The toner according to claim 1, wherein an average area ratio of the crystalline resin in the domains A of the release agent observed by scanning transmission electron microscopy is 10 to 50%.

6. The toner according to claim 1, wherein a content of the crystalline resin based on the binder resin is 5.0 to 15.0% by mass.

7. The toner according to claim 4, wherein the binder resin contains amorphous resins A1, A2 and A3, and $$2.05 \le SP1 - SPc \le 2.86$$

$$0.20 \le SP2 - SP1 \le 0.61$$

$$0.20 \le SP3 - SP2 \le 0.61$$

when SP1, SP2 and SP3 are respectively SP values $[(J/cm^3)^{0.5}]$ of A1, A2, and A3.

8. The toner according to claim 1, wherein both the amorphous resin and the crystalline resin are polyester resins.

9. The toner according to claim 1, wherein the release agent is a hydrocarbon wax.

10. A method of producing a toner that contains a toner particle containing a binder resin and a release agent, the binder resin comprising an amorphous resin and a crystalline resin, a content of the crystalline resin being 1.0 to 20.0% by mass based on a mass of the binder resin, the method comprising the steps of:

melt-kneading a material containing the amorphous resin, the crystalline resin and the release agent to obtain a melt-kneaded product; and pulverizing the melt-kneaded product to obtain powder, wherein in a cross-section of the toner particle observed by scanning transmission electron microscopy (i) there exists a matrix A of the amorphous resin with domains A of the release agent dispersed therein, (ii) domains A each include a matrix B of the release agent with domains B of the crystalline resin dispersed therein, and (iii) the domains A are each covered with the crystalline resin, and an average coverage of the domains A by the crystalline resin is at least 70%, and a melting point difference obtained by subtracting a melting point of the release agent from a melting point of the crystalline resin is 0 to 10° C., and a heat-melted crystalline resin composition obtained by separation operation of an N,N-dimethylformamide soluble fraction of the toner particle by a solvent gradient elution method has a visible light transmittance per 1 mm optical path length of at least 90%, the crystalline resin composition comprising a portion constituting domain B and a portion covering domain A.

* * * * *